United States Patent
Jurica et al.

[11] Patent Number: 6,128,815
[45] Date of Patent: Oct. 10, 2000

[54] PROCESS OF FORMING A VEHICLE BED

[75] Inventors: Joseph J. Jurica, Mt. Clemens; Arnold L. Brown, Macomb, both of Mich.

[73] Assignee: Pullman Industries, Inc., Pullman, Mich.

[21] Appl. No.: 08/903,887

[22] Filed: Jul. 31, 1997

Related U.S. Application Data

[63] Continuation-in-part of application No. 08/780,834, Jan. 10, 1997, Pat. No. 5,938,272.

[51] Int. Cl.⁷ ..................................................... B23P 17/00
[52] U.S. Cl. ............................ 29/417; 296/183; 296/198; 296/39.1; 29/897.2
[58] Field of Search ..................................... 296/184, 208, 296/183, 39.1, 198; 29/897.2, 897, 897.32, 897.3

[56] References Cited

U.S. PATENT DOCUMENTS

| | | | |
|---|---|---|---|
| 1,085,431 | 1/1914 | Kane | 72/379.6 |
| 1,462,474 | 7/1923 | Atkinson . | |
| 1,469,321 | 10/1923 | Kramer | 52/798.1 |
| 1,508,566 | 9/1924 | Moffat . | |
| 1,806,428 | 5/1931 | Travis | 296/183 |
| 2,073,058 | 3/1937 | Greene . | |
| 2,199,377 | 4/1940 | Tangerman . | |
| 2,301,636 | 11/1942 | Nicol . | |
| 2,671,491 | 3/1954 | Biordi . | |
| 2,775,284 | 12/1956 | Hermann . | |
| 2,853,330 | 9/1958 | Harry . | |
| 2,988,033 | 6/1961 | Gapp . | |
| 3,059,733 | 10/1962 | Hermann . | |
| 3,110,371 | 11/1963 | Ridder . | |
| 3,209,432 | 10/1965 | Cape . | |
| 3,253,375 | 5/1966 | Takehara . | |
| 3,310,925 | 3/1967 | Le Brun . | |
| 3,481,643 | 12/1969 | Campbell | 296/204 |
| 3,838,590 | 10/1974 | Van Dijk . | |
| 4,014,148 | 3/1977 | Harter . | |
| 4,109,503 | 8/1978 | Francon et al. . | |
| 4,188,058 | 2/1980 | Resa et al. . | |
| 4,215,898 | 8/1980 | Ulics . | |
| 4,354,708 | 10/1982 | Koto . | |
| 4,631,891 | 12/1986 | Donavich . | |
| 4,750,776 | 6/1988 | Barben . | |
| 4,914,886 | 4/1990 | Eriksson et al. . | |
| 5,137,322 | 8/1992 | Muirhead . | |
| 5,188,418 | 2/1993 | Walworth, Jr. et al. . | |
| 5,231,862 | 8/1993 | Ashley . | |
| 5,544,932 | 8/1996 | Walworth, Jr. et al. . | |
| 5,575,525 | 11/1996 | Walworth, Jr. et al. . | |
| 5,755,481 | 5/1998 | Emery . | |
| 5,938,272 | 8/1999 | Jurica et al. . | |

FOREIGN PATENT DOCUMENTS

| | | |
|---|---|---|
| 1 329 659 | 5/1963 | France . |
| 30 12 567 | 10/1981 | Germany . |
| 30 12 567 A1 | 10/1981 | Germany . |

*Primary Examiner*—S. Thomas Hughes
*Assistant Examiner*—Steven A Blount
*Attorney, Agent, or Firm*—Flynn, Thiel, Boutell & Tanis, P.C.

[57] ABSTRACT

A vehicle bed assembly, and process of manufacture, which involves formation of a one-piece floor pan by roll forming. The floor pan has a central pan portion and secondary portions positioned forwardly and rearwardly of wheelwell openings formed in the pan adjacent opposite side edges thereof. Strengthening ribs extend longitudinally throughout the entire length of the pan and terminate at the front and rear edges. The strengthening ribs also extend longitudinally of the secondary portions and terminate at front and rear edges of the wheelwell openings. The one-piece floor pan has the wheelwell openings formed therein, as by a controlled notching operation, after the pan has been roll formed from flat sheet material, and the notching operation provides a series of flanges around the periphery of the wheelwell opening, both along the longitudinal inner edge and on the front and rear edges. Some of the flanges are coplanar with top walls of the stiffening ribs, and others are coplanar with the base wall of the pan between the stiffening ribs. The roll-formed pan is subjected to a subsequent forming operation which causes the flanges to be wiped downwardly generally into a perpendicular relationship so that the flanges are positionable in overlapping relationship to the vehicle inner side wall or wheelwell housing for securement thereto, such as by welding.

26 Claims, 16 Drawing Sheets

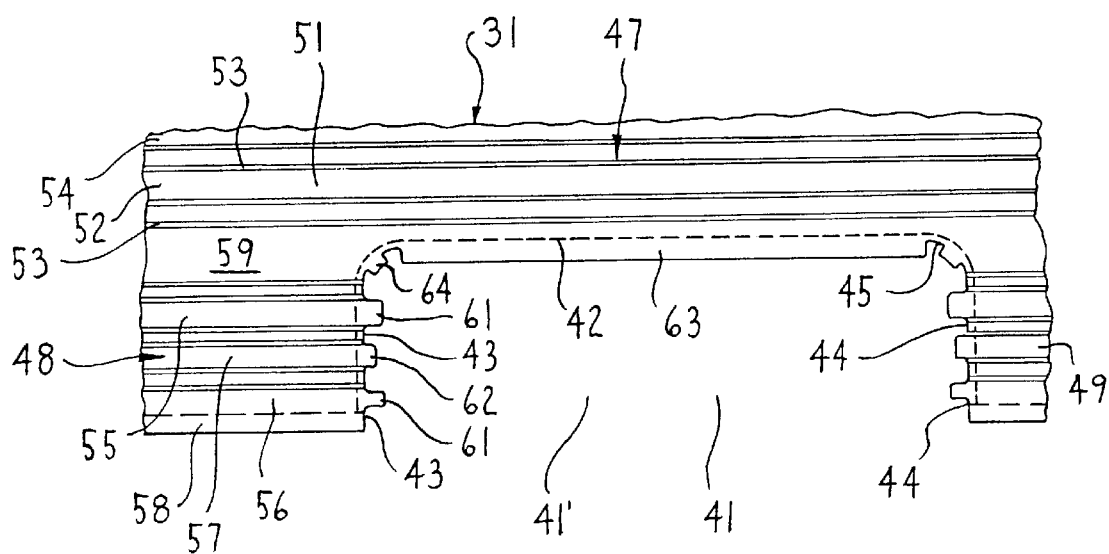
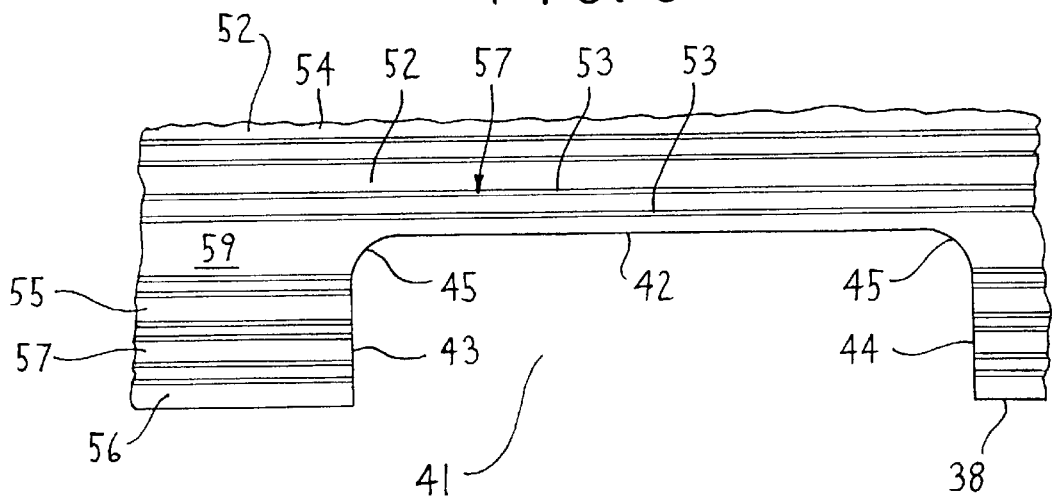

PROCESS OF FORMING A VEHICLE BED

CROSS REFERENCE TO RELATED APPLICATION

This is a continuation-in-part of our application Ser. No. 08/780 834, now U.S. Pat. No. 5,938,272, filed Jan. 10, 1997.

FIELD OF THE INVENTION

This invention relates to an improved one-piece ribbed floor pan for a vehicle bed, such as a truck bed, and the related process of manufacture.

BACKGROUND OF THE INVENTION

A box of a vehicle, such as a pickup truck, is illustrated in FIG. 1. This box conventionally includes a horizontally enlarged floor or bed assembly 12 which extends sidewardly between and is joined to generally parallel and upwardly extending side panels or walls 13. The side panels 13 conventionally have wheelwell housings 14 formed therein, the latter typically projecting at least inwardly a small extent into the interior of the box. The front end of the floor assembly 12 is also rigidly joined to an upwardly-projecting front wall or panel 15, the latter extending between and being rigidly fixed to the side panels 13. The rear of the box is normally closed by a rear panel 16, the latter conventionally being an openable tailgate 16 which is conventionally hingedly joined to the box and can swing into an open generally horizontal position wherein it is substantially flush with the floor assembly to provide access to the interior of the box.

This box, and specifically the floor or bed assembly 12, conventionally includes a horizontally enlarged main bed member 17, commonly referred to as the floor pan, which defines the actual floor of the box and extends lengthwise between the front and rear ends of the box, and has a width which normally substantially spans the width of the opening between the wheelwell housings. This main floor pan 17 is supported on a front cross rail 18, several intermediate cross rails 19, and a rear cross rail or sill member 21, the latter all extending transversely under the pan and being fixedly secured thereto, such as by spot welding. Some of these cross members, such as the front rail 18, the frontmost intermediate rail 19 and the rear sill 21 are typically fixedly secured to the vehicle frame (not shown) in a conventional manner.

The bed assembly 12 also normally includes secondary bed or floor pan members 22, the latter being positioned adjacent and fixedly joined to opposite longitudinal edges of the main floor pan 17 so as to occupy the regions of the bed disposed forwardly and rearwardly of the wheelwell housings 14.

In the pickup box as conventionally constructed, the main floor pan 17 is provided with stiffening ribs 23 which project upwardly from the pan, with a plurality of such ribs being generally uniformly sidewardly spaced apart across the width of the pan and extending longitudinally of the pan over a majority of the length thereof. These ribs, which are deformed upwardly from the pan to define a downwardly-opening channel-like cross section, generally extend rearwardly from adjacent the front free edge of the main pan 17 but the ribs normally terminate in tapered rib ends 24 which merge downwardly into the planar profile of the pan 17 at a location disposed close to but spaced forwardly a small distance from the rear free edge 25 of the pan. The rear edge portion of the main pan 17, namely the flat portion thereof which is free of the ribs, is then normally seated within a shallow recess formed in the top wall of the rear sill member 21 so as to be substantially flush with the upper surface of the sill member, with the rear pan and sill member then being suitably fixedly secured together, such as by spot welding. This arrangement enables the groovelike regions defined between adjacent ribs 23 to freely open outwardly through the rear end of the bed assembly, and hence prevent creation of pockets or recesses which would collect dirt or moisture. The secondary pan members 22 also conventionally have stiffening ribs 23 formed therein and extending longitudinally of the bed, with the stiffening ribs 23 in the secondary pan members 22 again typically terminating short of the front and rear edges of the respective pan member.

FIG. 2 illustrates therein another conventional prior art box of a vehicle, such as a pickup truck, wherein the parts thereof corresponding to FIG. 1 have been identified by the same reference numerals but with the addition of a prime (') thereto. The bed assembly 12' of FIG. 2 again includes an enlarged main bed member or portion 17' which extends longitudinally throughout the length of the bed and defines the region which extends generally transversely between the wheelwell housings of the vehicle. The bed assembly 12' also again includes secondary bed members or portions 22' which occupy the regions of the bed disposed forwardly and rearwardly of the wheelwell housings 14. In this prior art construction, however, the main bed portion 17' and the secondary portions 22' are all integrally formed in one piece and, as is generally conventional, are provided with downwardly depending flanges which project generally longitudinally along the side edges and also along the edge of the wheelwell openings for permitting securement to the adjacent side panels or wheelwell housings. The stiffening ribs associated with both the main and secondary portions 17' and 22', respectively, again are formed such that the ends thereof terminate in longitudinally spaced relation from the longitudinal end edges, particularly the rear edge of the bed.

A bed assembly having the structure described above has, for a very long time, been constructed using individual members which have been stamped utilizing large forming presses. That is, the floor pan 17 (FIG. 1) or 17', 22' (FIG. 2) as well as the cross rails 18, 19 and 21 have been conventionally formed from flat steel sheets by positioning a precut steel sheet in a forming press which deforms the sheet to define the desired cross section of the finished member. This stamping or pressforming technique, however, even though extensively utilized for many years, possesses recognized disadvantages which have nevertheless been long tolerated in view of the belief that this was the best manner of constructing the bed assembly.

More specifically, the current and almost universally utilized technique of stamping the pan has resulted in limitations which have restricted optimum construction of the pan. For example, to stamp the floor pan 17 of FIG. 1, a large rectangular sheet must be precut in accordance with the size of the desired pan being stamped. The sheet is initially of excess width so as to provide portions along opposite edges of the sheet which can be used for clamping the sheet and holding it in position when the sheet is positioned within the press and subjected to the stamping operation. Further, during the actual stamping operation, the material of the sheet is physically deformed by the stamping die so as to permit creation of the longitudinal ribs. This necessarily results in significant changes in thickness of the sheet material due to the deformation which is caused during the rib formation process. Not only does the sheet undergo significant changes in thickness, but this change in thickness is also of varying amounts at different locations across the rib, or through the cross section of the sheet containing the ribs, so that the resulting stamped floor pan has a sheet thickness which has significant variation therein. This thickness variation can in some instances be as much as 40% to 50%. This stamping process has also been observed to result in bends or corners which are inconsistent in terms of both material thickness and included angle, and have provided a finished exterior appearance which permits such irregularities to be visually observed. This stamping operation also requires, after the pan has been stamped, that the pan be subjected to a further stamping or cutting operation which is effective for removing the clamping strip portions on opposite sides of the sheet, which strip portions are disposed of as scrap.

In view of the inherent but inconsistent thickness reductions which occur during forming of the pan by the stamping or pressing process, the pan must also be initially formed from a sheet material of greater thickness than desired so as to compensate for the expected thickness reductions which occur during the stamping operation. This increases the overall weight of the pan. Further, in view of the significant size of the main floor pan and the fact that it is deformed or stamped in basically a single pressing operation, this also necessitates utilization of an extremely large and high capacity forming press in order to accommodate both the size of the sheet and the significant pressing force encountered during the simultaneous deformation of the numerous ribs which extend longitudinally thereof. Further, these stamping operations necessarily can normally be successfully carried out only if lower strength and softer sheet steels are utilized since harder strength steels will typically split or crack if subjected to severe deformation of the type encountered in the conventional pan stamping operation.

The floor pan 17', 22' of FIG. 2 is basically formed in the same manner described above relative to the floor pan 17 of FIG. 1 in that it is typically formed by stamping in a large press from a single large precut rectangular sheet, which precut sheet also has the wheelwell openings precut in the sides thereof prior to stamping of the sheet in the forming press. This pan 17', 22', however, obviously experiences the same problems and deficiencies which result from this type of forming operation as described above.

In addition, when the pan of FIG. 2 is formed in a press, the securing flanges along the side edges and around the wheelwell are also press formed, either simultaneous with the overall pressing of the ribbed pan or in a subsequent pressing operation. In this pressing operation, the flanges are bent downwardly, and this has been observed to create manufacturing disadvantages in both the finished product and in the assembly thereof to the vehicle. For example, during this downward bending, the flange is basically swung in a cantilevered fashion about its hinge connection to the main pan member, and this results in undesired weakening due to thinning of the sheet material directly at the hinge point, and possible cracking. Further, since the flange typically extends substantially continuously along and around the wheelwell opening, the flange also tends to buckle at various points, and this causes undesired distortions in the flange. Even more significantly, this bending of the flange makes it difficult to position the flange accurately in downwardly perpendicular relation to the sheet, and in fact there is a well observed and known tendency for the flange to spring back when the bending force is removed, thereby making it difficult to achieve the desired accuracy of perpendicularly of the flange with respect to the sheet. This lack of accurate perpendicularly consequently often makes it difficult for the flanges to be properly fit against and be welded to a wheelwell housing.

To improve on the above-described vehicle bed structure and forming method thereof, the Assignee of this application developed the improved truck bed structures and forming methods disclosed in U.S. Pat. Nos. 5,188,418, 5,544,932 and 5,575,525, and copending U.S. application Ser. No. 08/661,062, all of which are assigned to Pullman Industries, Inc., the Assignee hereof, and are all herein incorporated by reference.

In the aforesaid patents, a truck bed is disclosed including a floor pan having strengthening ribs constructed by a roll-forming process. A rear sill member cooperates with the rear edge of the floor pan and has upward protrusions which interfit within and generally close the rearward ends of the ribs formed in the pan, whereby the ribs are capable of extending to the rear free edge of the pan and open longitudinally outwardly thereof to permit roll forming of the pan while facilitating proper water drainage from the bed when the pan is assembled in the vehicle, with the rear edge of the pan and specifically the ribs thus being supported and reinforced by the rear sill and the protrusions thereon.

In a continuing effort to improve on the truck bed disclosed in the aforementioned patents, the aforementioned copending application additionally discloses that the rear free edge of the ribbed roll-formed floor pan can be formed with a down-turned reinforcing flange extending longitudinally along the rear free edge, which flange projects downwardly so as to effectively overlap rear surfaces defined on the protrusions and rear sill to thus provide additional reinforcement directly at the rear free edge of the pan or bed.

The improved roll-formed bed arrangement as briefly summarized above, and specifically as disclosed in the aforementioned patents, was developed primarily to permit forming of a bed assembly in a manner similar to that illustrated in FIG. 1. That is, the roll-formed bed member disclosed in the aforementioned patents was intended primarily to be the main central pan member equivalent to the main pan member 17 of FIG. 1, whereby separate secondary pan members equivalent to the secondary pan members 22 of FIG. 1 would then be used in conjunction with the main pan member, which secondary members could be formed either by roll forming or by stamping. Manufacture of the main pan member 17 by roll forming, as disclosed in the aforementioned patents, was believed to be the most satisfactory approach for using roll forming in association with a vehicle bed so as to minimize and avoid unnecessary subsequent forming operations, such as stamping operations, which were considered to be of questionable feasibility if such forming operations had to be carried out subsequent to the roll forming of the ribbed pan member. While the aforementioned patents broadly suggest roll forming of the main and secondary pans as an integral one-piece member and the subsequent processing thereof to create wheelwell openings, nevertheless the aforementioned patents do not teach how such could be accomplished and, in view of the additional difficulties presented by this proposal, significant additional development and design is and was required in order to go beyond the broad suggestion of these patents.

Accordingly, it is an object of this invention to provide an improved vehicle bed assembly, specifically a truck bed assembly, and a method of manufacturing and assembling the primary components of the truck bed assembly, so as to overcome many of the disadvantages associated with the conventional and long-utilized stamp bed assemblies as described above, and so as to also provide further improvements over the roll-formed bed assemblies disclosed in the Assignee's aforementioned patents.

More specifically, the present invention relates to an improved vehicle bed assembly, and process of manufacture, which involves formation of a one-piece floor pan by roll forming, which floor-an has a main central pan portion as well as secondary or wing portions which are positionable forwardly and rearwardly of wheelwell openings formed in the pan adjacent opposite side edges thereof. The floor pan has strengthening ribs which extend longitudinally throughout the entire length thereof so as to terminate at the front and rear edges. The strengthening ribs extend in parallel relationship longitudinally throughout not only the main pan portion, but also longitudinally of the secondary portions, whereby these ribs terminate directly at front and rear edges of the wheelwell openings. The one-piece floor pan has the wheelwell openings formed therein, as by a controlled notching or punching operation, after the pan has been roll formed from flat sheet material, and the notching operation provides a series of flanges around the periphery of the wheelwell opening, both along the longitudinal inner edge and also on the front and rear edges thereof. The flanges are disposed in spaced relation, with some of the flanges being coplanar with top walls of the stiffening ribs, and others being coplanar with the bottom or base wall of the pan between the stiffening ribs. The roll-formed,pan is subjected to a subsequent forming operation which causes the flanges to be wiped downwardly generally into a transverse or perpendicular relationship with respect to the plane of the base wall of the pan so that the flanges are positionable in adjacent and overlapping relationship to the truck inner side wall or wheelwell housing for securement thereof, such as by welding. The roll-formed ribs extend longitudinally of the pan and thus terminate not only at the rear free edge thereof, but also at the front and rear edges of the wheelwell openings.

In the preferred construction of the invention, as briefly summarized above, the rear of the one-piece pan is positioned on a rear support sill or channel member which extends transversely of the vehicle adjacent the rear of the bed. This sill preferably incorporates upper protrusions in spaced relationship therealong, which protrusions project upwardly into the rearward free ends of the stiffening ribs to support and reinforce the stiffening ribs directly adjacent the rearward free ends thereof.

The improved pan or bed member, as aforesaid, preferably provides the stiffening ribs in uniformly sidewardly-spaced relationship transversely across the main pan portion, with the ribs preferably having top walls of substantial transverse width to define the direct load-bearing surface of the bed assembly. The sidewardly spacing between adjacent ribs is typically selected so that the spacing, as defined by the base wall of the pan, is generally no greater than and preferably less than the transverse width of the top wall of the stiffening ribs to maximize the upper surface area defined by the top walls of the ribs. The configuration of the pan member and specifically the roll-formed rib pattern therein, however, is preferably selected so that the longitudinally-extending inner edge of the wheelwell is formed in a base wall as defined between two sidewardly adjacent ribs. Further, the base wall containing the longitudinally-extending inner edge of the wheelwell is, in a preferred embodiment, provided with a greater transverse width than the base walls between the other ribs so as to facilitate the creation of a flange along the longitudinally inner edge of the wheelwell, which flange can initially be formed from and coplanar with the base wall, and then subsequently deformed downwardly in generally perpendicular relationship therewith to facilitate the overall forming of the pan.

In the improved bed assembly of this invention, as aforesaid, the one-piece bed member is also preferably provided with at least two downwardly-projecting cantilevered securing flanges integrally associated with each of the front and rear edges of each wheelwell opening. These two cantilevered flanges are disposed in sidewardly-spaced relation and are of different lengths, with a longer one of the flanges being integral with the top wall of a stiffening rib which intersects the wheelwell opening, and the other flange being of shorter extent and integral with a base wall which intersects the wheelwell opening. These flanges when deformed downwardly both terminate at about the same elevation and permit securement to the vehicle, such as direct securement to the wheelwell housing.

The present invention also relates to an improved process for forming the vehicle bed, as aforesaid, specifically a one-piece roll-formed ribbed bed member having wheelwell openings formed in opposite side thereof, as well as the process for securing the bed member to the support rails and rear sill as well as other vehicle components to effectively define an assembled bed assembly.

The present invention, in addition to the improvements and advantages briefly summarized above, is also believed to provide manufacturing economies with respect to the overall manufacturing process, and permit creation of cross sections or shapes in the bed and specifically in the pan member which are not possible with stamping or press-forming operations, including the creation of sharper corners having a higher consistency with respect to both curvature and thickness.

Other objects and purposes of the invention will be apparent to persons familiar with structures and processes of this general type upon reading the following specification and inspecting the accompanying drawings.

BRIEF DESCRIPTION OF THE DRAWINGS

FIG. 8 is a fragmentary top view corresponding to FIG. 6 but showing the pan member subsequent to a notching operation which simultaneously effects formation of the wheelwell opening as well as formation of securing tabs at locations along the periphery of the wheelwell opening.

FIG. 9 is a fragmentary top view corresponding to FIG. 8 but showing the one-piece pan member subsequent to a wiping operation which causes the securing tabs both along the side edge of the pan and the side edge of the wheelwell opening to be deformed downwardly for deposition substantially as illustrated by FIG. 5.

Figure 1:
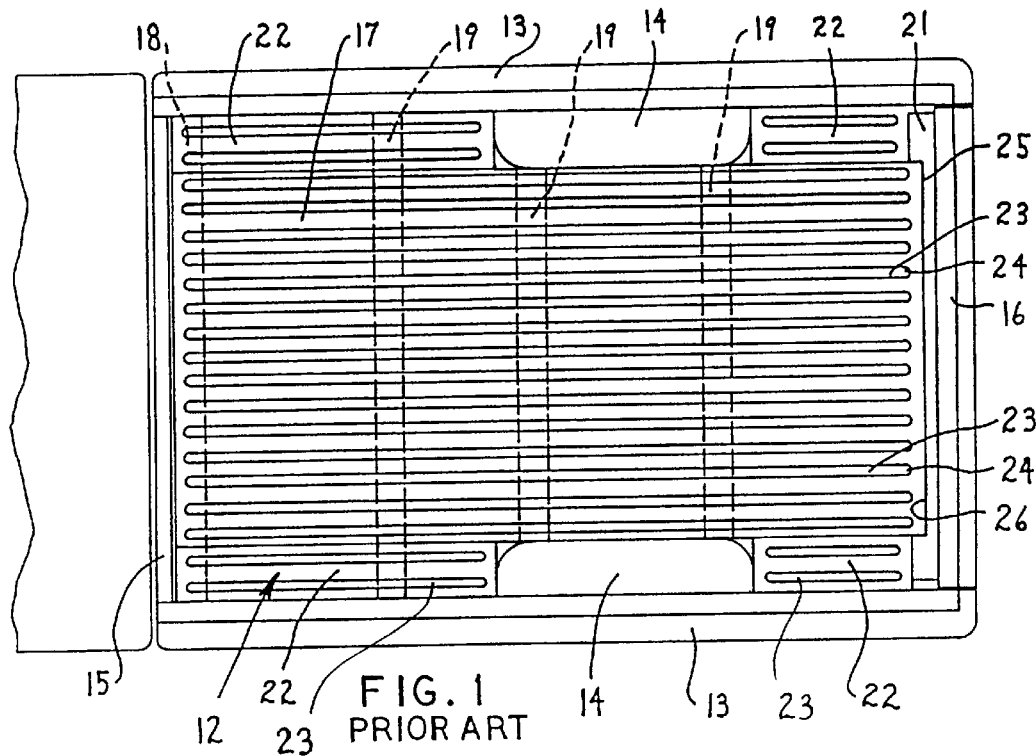
FIG. 1 is a top plan view of a conventional pickup truck box which illustrates a first well know construction of a bed assembly.
Figure 2:
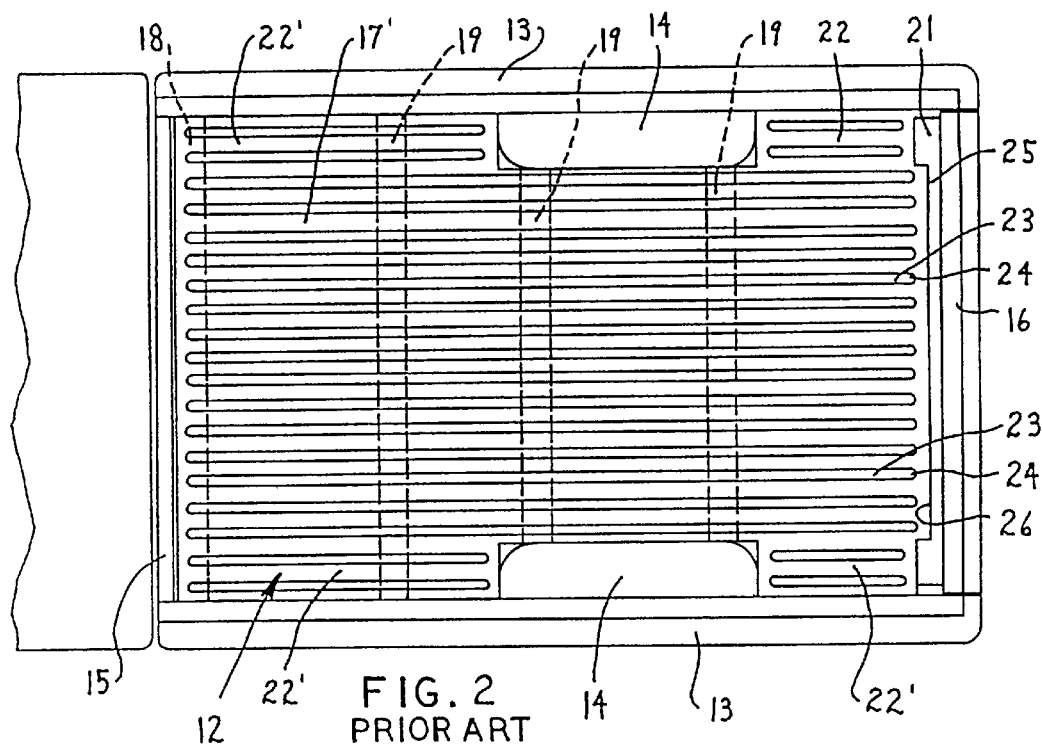
FIG. 2 is a top plan view similar to FIG. 1 but illustrating a second well known construction of the bed assembly.

Certain terminology will be used in the following description for convenience in reference only, and will not be limiting. For example, the words "upwardly", "downwardly", "rightwardly" and "leftwardly" will refer to directions in the drawings to which reference is made. The word "upwardly" will also be used in reference to an exposed top surface of the floor pan of the bed assembly. The words "inwardly" and "outwardly" will refer to directions toward and away from, respectively, the geometric center of the box or bed assembly, or designated parts thereof. Said terminology will include the words specifically mentioned, derivatives thereof, and words of similar import.

DETAILED DESCRIPTION

The improved vehicle bed assembly of the present invention will now be described, particularly with reference to FIGS. 3–9.

Figure 3:
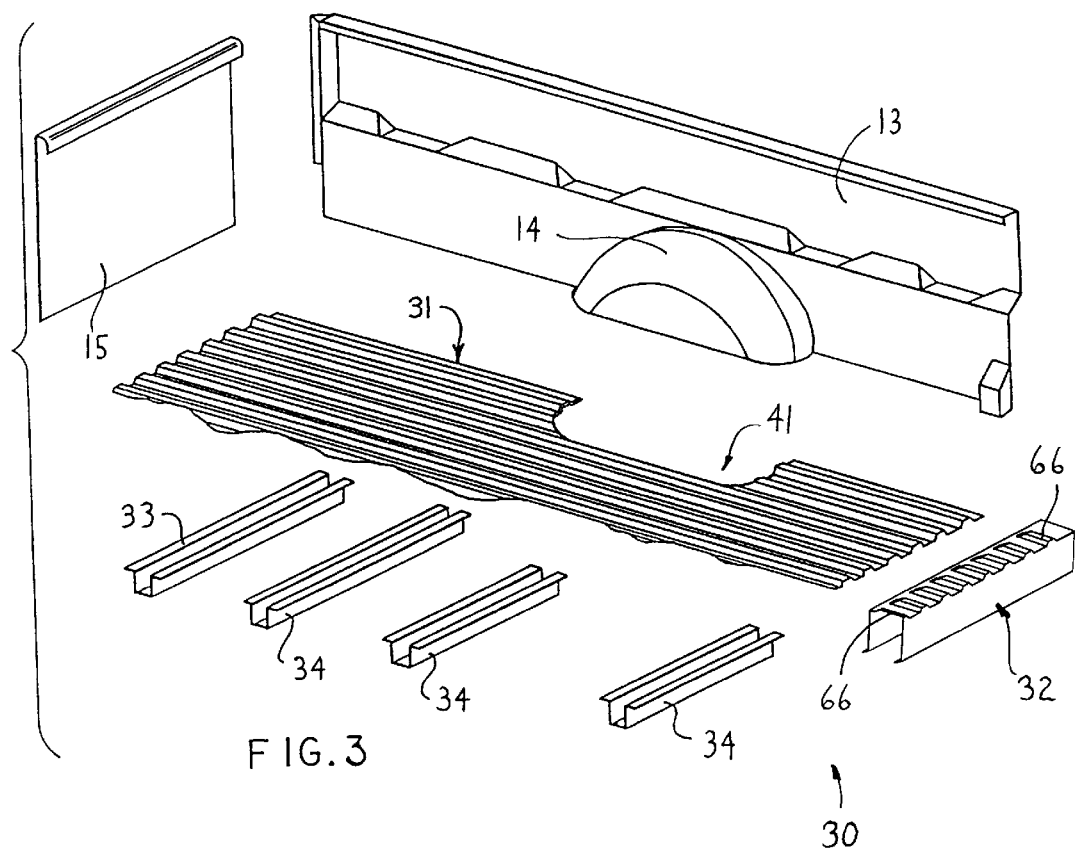
FIG. 3 is an exploded perspective view illustrating the basic components which cooperate with the improved pan member of this invention so as to define the improved bed assembly of this invention.
Figure 4:
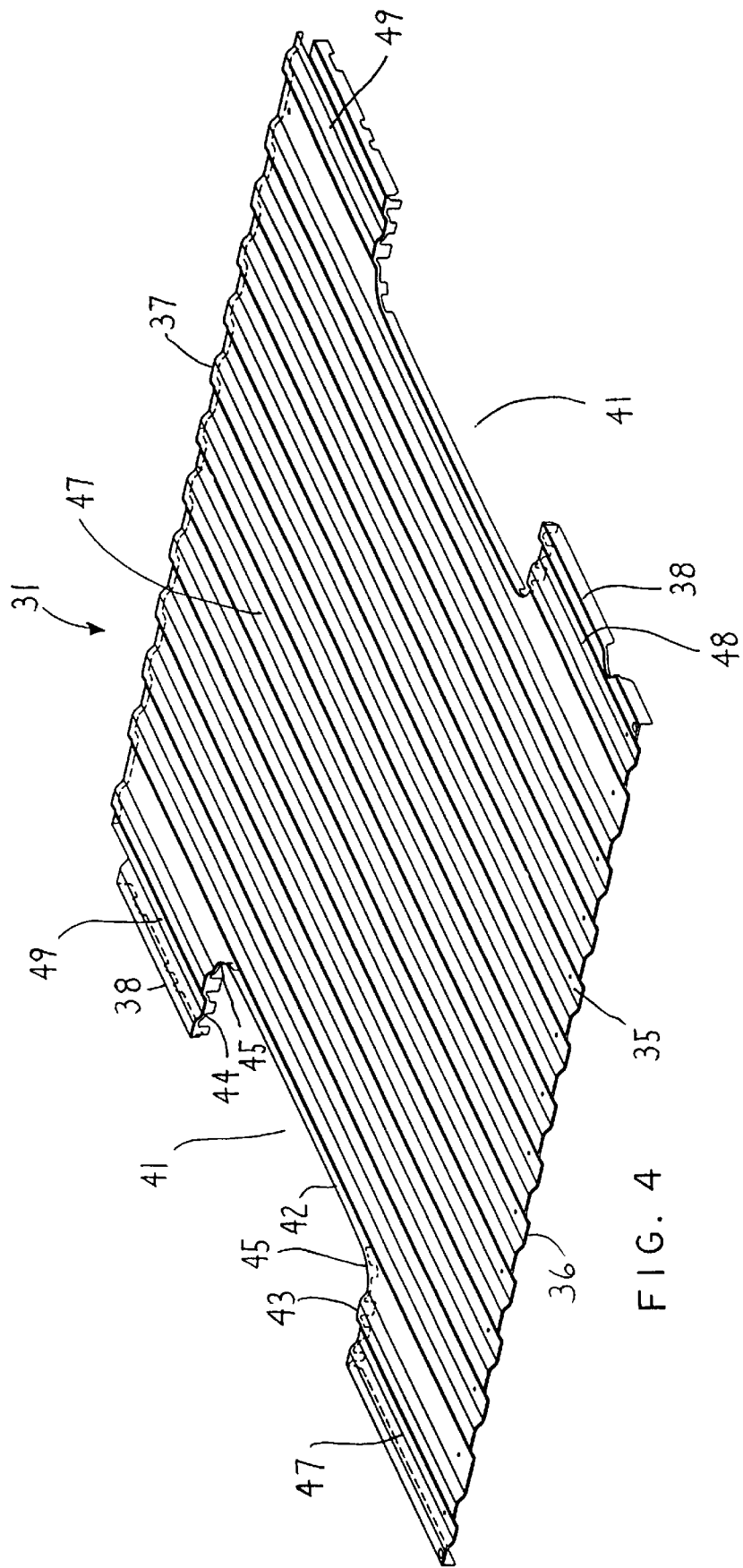
FIG. 4 is a perspective view which illustrates the improved one-piece floor pan according to the present invention.

The floor or bed assembly 30 of the invention, as illustrated specifically by FIGS. 3 and 4, employs a main floor pan or bed member 31 which cooperates with and has the rear edge thereof supported on a rear cross rail or sill member 32, the latter extending transversely across the vehicle bed adjacent the rear end thereof. The pan or bed member 31 is also supported adjacent the front edge thereof on a front cross member or rail 33, and several (three in the illustrated embodiment) intermediate cross rails 34 are also fixedly secured under the bed member 31 in parallel but spaced relation between the front and rear cross rails. This general arrangement is conventional.

The floor pan or bed member 31 is formed, preferably roll formed as described hereinafter, from a thin sheet 35 of metal, preferably high strength steel having a thickness of about 0.8 mm, so that the pan member 31 is of an integral and monolithic one-piece construction with the pan member having substantially uniform thickness throughout the entire transverse and longitudinally cross sectional extent thereof.

The one-piece monolithic pan member 31, following its being longitudinally roll formed and cut to length, is of a generally horizontally enlarged rectangular configuration and has front and rear free edges 36 and 37, respectively, extending transversely of the longitudinally-extending (i.e., front to back) direction of the pan member. The pan member additionally has generally parallel side edges 38 which extend longitudinally and substantially perpendicularly intersect the respective front and rear free edges.

The rectangularly-shaped roll-formed pan member 31, as generally described above, has a pair of wheelwell openings 41 formed therein subsequent to the roll forming of the pan member. The wheelwell openings 41 are typically disposed intermediate the front and rear edges of the pan member, and open inwardly from the respective side edges 38 so that the pair of wheelwell openings are transversely aligned relative to the longitudinal direction of the bed member. Each wheelwell opening 41 has a configuration so as to receive therein the wheelwell housing 14 associated with the respective vehicle side wall 13. The wheelwell opening 41, as illustrated in FIGS. 4 and 9, has an inner edge 42 which is elongated generally longitudinally of the bed member and which joins to respective front and rear edges 43 and 44 which project transversely outwardly and intersect the side edge 38 of the bed member. The front and rear edges 43 and 44 are joined to the inner edge 42 through arcuate or rounded edges or corners 45. The exact shape of the wheelwell opening 41 will, of course, vary depending upon the overall vehicle construction, but will generally have a configuration similar to that described above.

The monolithic one-piece bed member 31, when the wheelwell openings 41 are formed therein, thus includes a main central bed section 47 which extends longitudinally between the respective front and rear edges 36 and 37, and also extends transversely between the inner edges 42 of the sidewardly-spaced pair of wheelwell openings 41. The monolithic one-piece bed member 31 also includes front and rear secondary or side bed sections 48 and 49, respectively, which are respectively positioned forwardly and rearwardly of the wheelwell openings 41. The front secondary bed sections 48 are integrally joined to and project transversely from the main bed section 47 and extend longitudinally between the front edge 36 of the bed member and the front edge 43 of the respective wheelwell opening 41. The rear secondary bed sections 49 are also integrally and monolithically joined to and project transversely from the main bed section 47 and extend longitudinally of the bed member from the rear edge 44 of the respective wheelwell opening 41 to generally the rear edge of the bed member. These secondary bed sections 48 and 49 define thereon the longitudinally-extending side edges 38 of the bed member 31.

The bed member 31, due to the deforming thereof by longitudinal roll forming, has a plurality of longitudinally-elongate stiffening ribs 51 projecting upwardly from the plane of the thin sheet 35. A plurality of substantially identical such ribs 51 are generally uniformly sidewardly spaced apart in the transverse or widthwise direction of the main or central pan section 47, with the ribs 51 extending longitudinally of the pan 31 in generally parallel relationship. The ribs 51 have a generally inverted channel-like or U-shaped cross section, whereby each adjacent pair of ribs 51 define an elongate valley 50 therebetween, the base or bottom of the valley being defined by the original planar thin sheet 35. The ribs 51 project longitudinally throughout the entire length of the pan member 31 so as to terminate at the respective front and rear edges 36 and 37 thereof. These ribs provide the central floor pan section 47 with a substantially uniform transverse corrugated cross section throughout the entire longitudinal extent thereof.

Figure 7:
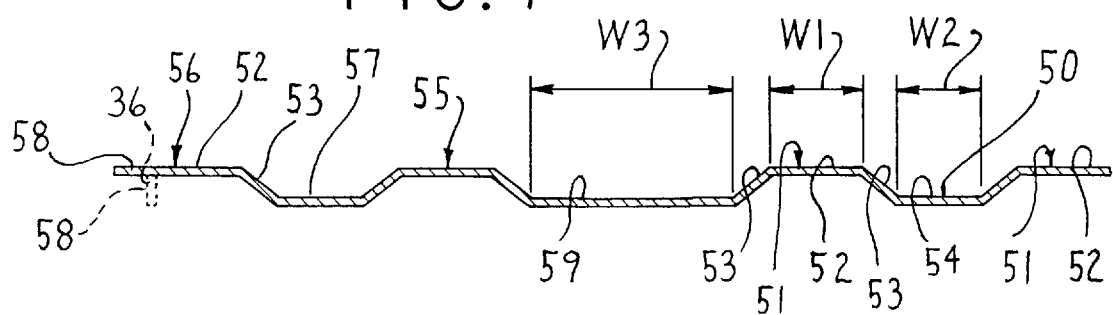
FIG. 7 is a fragmentary sectional view taken generally along line 7—7 in FIG. 6.

As illustrated by FIG. 7, each rib 51 has a generally flat longitudinally-extending top wall 52 which extends transversely between and is joined to a pair of downwardly-projecting side walls 53, the latter pair of side walls preferably diverging with respect to one another as they project downwardly in sloped or angled relation relative to the respective top wall 52. These side walls 53 define sides of the respective valleys 50 which extend longitudinally of the pan member between adjacent ribs 51, and the bottom of the valley is defined by a base wall 54 which extends longitudinally between the front and rear free edges of the pan member and which also extends transversely between and integrally and monolithicly joins to the lower edges of side walls 53 associated with two adjacent ribs 51.

Figure 7A:
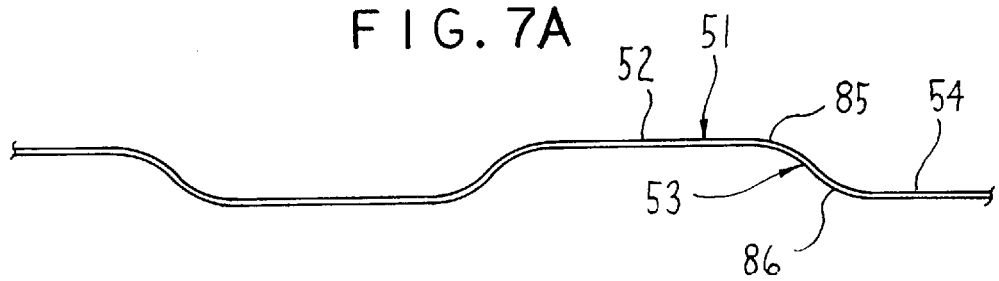
FIG. 7A is an enlarged fragmentary sectional view similar to FIG. 7 but illustrating the preferred corrugated cross sectional configuration of the pan achieved by roll forming of the pan according to the present invention.

While FIG. 7 generally illustrates the corrugated roll-formed cross sectional configuration of the floor pan 31, reference is made to FIG. 7A which more accurately illustrates the preferred corrugated cross section of the floor pan 31 which can be desirably achieved when the pan is roll formed in accordance with the present invention. By roll forming of the floor pan 31, it has been discovered that the side walls 53 which connect the top walls 52 and the base walls 54 need not be flat such as is conventionally required when the ribs are formed in a press, but rather the roll forming enables the side walls 53 to have a generally smoothly-curved S-shaped vertical configuration so as to provide a much more desirable transition between the top and bottom walls 52 and 54. The side wall 53 specifically includes an upper portion 85 which is of a generally circular arcuate convex configuration and a lower portion 86 which is also of a generally circular arcuate convex configuration, with these portions 85 and 86 being reversely oriented relative to their centers of radii, and effectively defining a smooth transition between the upper and lower walls. The upper arcuate part 85 specifically is formed so as to tangentially join to the upper wall at one end, and at its other end substantially tangentially joins to the upper end of the lower arcuate wall part 86. This lower arcuate wall part at its lower end then in turn tangentially joins to the lower wall 54. In this fashion, the side wall 53 in effect does not include any planar or straight portion in the vertical extent thereof, and the creation of the wall parts 85 and 86 by the rolling forming technique wholly eliminate sharp corners or bends and maintains uniform thickness of material throughout the cross section of the bed member. The radii defining the arcuate wall parts 81 and 82 are preferably substantially equal, and this radius will preferably have a magnitude which is about one-half the height of the rib 51, which magnitude is also many times (for example, at least an order of magnitude) greater than the thickness of the sheet material thickness.

In a preferred construction of the invention, the top walls 52 of ribs 51 preferably have a transverse width W1 which is at least equal to and more preferably greater than the transverse width W2 of the valley base walls 54. This thus permits the overall planar support area defined by the summation of the top walls 52 to be of significant magnitude to thus facilitate utilization of the vehicle bed since the upper surfaces of these top walls 52 thus effectively define the load-engaging plane of the bed member.

Figure 6:
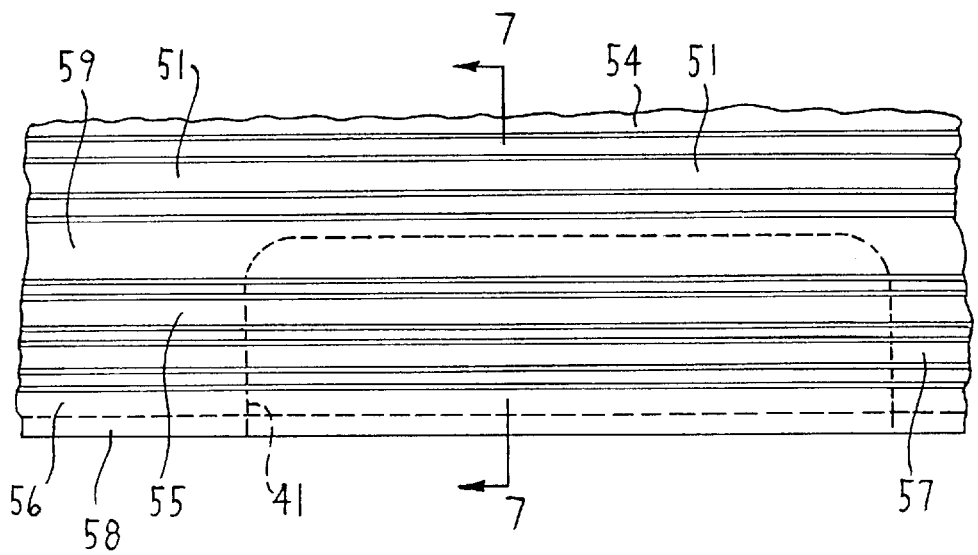
FIG. 6 is a fragmentary top view of one side portion of the one-piece pan member subsequent to roll forming thereof, but prior to notching of the wheelwell opening therein.

The side or secondary pan portions 48, 49 are also roll formed so as to have upwardly-projecting stiffening ribs associated therewith and projecting longitudinally of the pan member in generally parallel relationship with the stiffening ribs 51 associated with the central pan section 47. In the illustrated embodiment the side or secondary sections 48, 49 are provided with two sidewardly-spaced stiffening ribs, namely an intermediate stiffening rib 55 and an edge stiffening rib 56. These ribs 55 and 56 are roll formed into the pan member 31 simultaneously with the forming of the ribs 51, and the ribs 55 and 56 extend longitudinally and continuously between the front and rear edges of the pan member 31 prior to forming of the wheelwell openings 41 therein, substantially as illustrated by FIGS. 6 and 7. These ribs 55 and 56, however, after forming of the wheelwell opening 41 in the pan member, terminate at the front and rear edges of the wheelwell opening substantially as illustrated by FIGS. 8 and 9.

The intermediate rib 55 may be similar in shape and size as the ribs 51 and is disposed adjacent and sidewardly-spaced from the edge rib 56 through an intermediate base wall 57 connected therebetween, which base wall 57 is coplanar with and generally similarly corresponds to the base walls 54 described above. The edge rib 56, in the illustrated embodiment, has a side wall 53 associated with only one side thereof, and the top wall 52 of the edge rib 56 defines the longitudinally-extending side edge 38 of the finished pan member 31. This top wall 56, however, prior to forming of the wheelwell openings, has a flange 58 which is a monolithic and integral coplanar extension of the top wall 52, which flange 58 is subsequently deformed generally perpendicularly downwardly as indicated by dotted lines in FIG. 7 so as to define a securing flange 58 for attachment to the vehicle side wall 13.

The intermediate rib 55 is transversely joined to the transversely adjacent rib 51 of the central pan section 47 by a base wall 59 which extends longitudinally between the front and rear edges of the pan member and is generally coplanar with the other base walls 54 and 57. This base wall 59, however, preferably has a transverse width W3 which is significantly greater than the transverse width W2 of the base walls 54. In fact, the width W3 will preferably typically be at least about 1.5 times the width W2 and in fact may be as much as about 2.0 times the width W2.

As illustrated by FIGS. 5–6 and 8–9, the longitudinally-extending base wall 59 has the longitudinally-extending inner edge 42 of the wheelwell opening 41 formed therein, and the increased transverse width W3 of this base wall 59 facilitates the forming of the inner edge 42 therein, together with securing flanges which are subsequently deformed downwardly from the base wall 59 for securement to the wheelwell housing 41.

Figure 5:
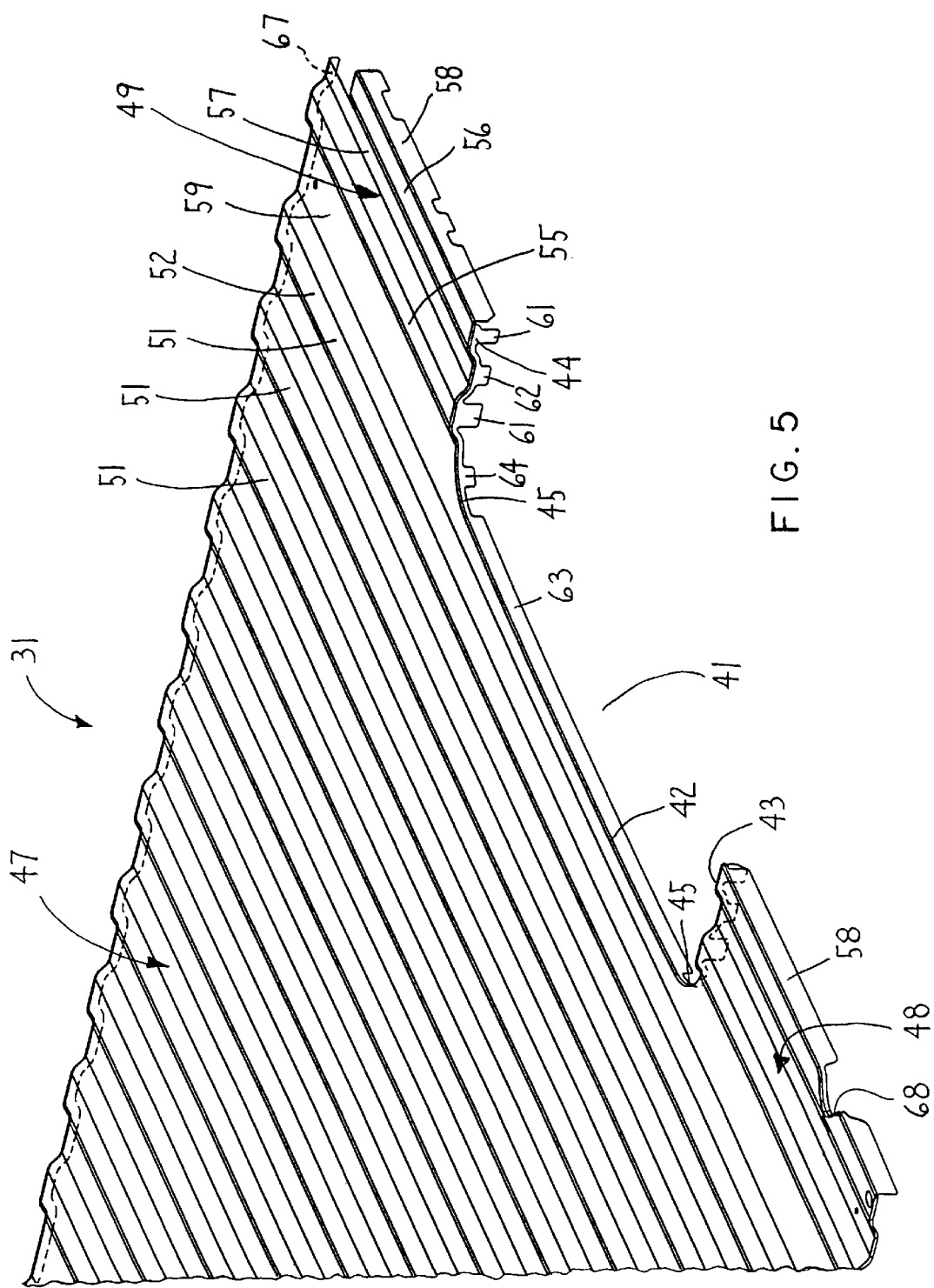
FIG. 5 is an enlarged fragmentary perspective view of a portion of FIG. 4 and specifically illustrating that part of a one-piece pan member having a wheelwell opening formed therein.

More specifically, and as illustrated by FIG. 8, the one-piece longitudinally-ribbed roll-formed pan member as illustrated in FIG. 6 is thereafter subjected to a notching operation which is for the purpose of forming the wheelwell openings 41 therein. This notching or punching operation initially results in formation of a modified wheelwell opening 41', the edges of which are interrupted by cantilevered flanges or tabs which project generally horizontally coplanar from the pan member into the wheelwell opening. These flanges and tabs are then subsequently deformed downwardly in generally perpendicular relationship to the plane of the respective top and base walls of the pan member so as to provide the finished wheelwell opening 41 substantially as illustrated by FIGS. 5 and 9.

Referring again to FIG. 8, the forming of the modified opening 41' in the side portion of the pan member results in the forming of a cantilevered flange 61 which is coplanar with the top wall 52 of the edge rib 56. The tab 61 projects longitudinally of the respective rib away from the respective front and rear wheelwell opening edges 43 and 44 so as to project into the region which will ultimately define the wheelwell opening 41. Similar and substantially identical flanges 61 are also coplanar with and integrally joined to the top wall of the intermediate ribs 55 and project longitudinally thereof beyond the wheelwell opening edges 43 and 44 into the region of the wheelwell opening 41. The intermediate base wall 57 also has a flange 62 integrally attached thereto and disposed in coplanar relationship therewith, with the flange 62 also being longitudinally cantilevered outwardly beyond the respective wheelwell edges 43 and 44 so as to project into the wheelwell opening 41. The flanges 62, however, are of shorter cantilevered extent or length than are the flanges 61, as illustrated in FIG. 8. In fact, the flanges 62 typically have a length which is less than the length of the flanges 61 by an amount which approximately corresponds to the height of the stiffening ribs so that when the flanges 61 and 62 are deformed downwardly as illustrated in FIG. 5, the lower free edges of the flanges 61 and 62 will be approximately at the same elevation.

The base wall 59 is also provided with a flange 63 which, after forming of the intermediate opening 41' as illustrated in FIG. 8, is substantially coplanar with the base wall 59 and in fact originally comprises a part of the base wall 59. This flange 63 extends longitudinally a significant extent along the inner edge of the intermediate opening 41', with this flange 63 being transversely (i.e. sidewardly) cantilevered only a relatively small distance. The sideward cantilevered distance approximately corresponds to the cantilevered length of the flanges 62, whereby downward displacement of the flange 63 into the position illustrated by FIG. 5 thus results in the forming of the longitudinally-extending inner edge 42 of the wheelwell opening 41.

The base wall 59, in the illustrated embodiment, adjacent each of the rounded wheelwell opening corners 45, is also provided with a further coplanar and cantilevered flange 64 which is disposed intermediate and spaced from the adjacent cantilevered flanges 61 and 63. The flange 64, due to its being coplanar with the base wall 59, also has a shorter length which generally corresponds to the cantilevered length of the flanges 62 and 63. These flanges 64 are also deformed downwardly into the position illustrated by FIG. 5 so as to define the wheelwell opening 41 as illustrated in FIG. 9, whereby the flanges 61, 62, 63 and 64 are thus all disposed for substantially abutting contact with and, securement to the wheelwell housing 14, such as by welding.

The forming of the one-piece monolithic floor pan member 31, as illustrated in FIG. 4, will now be briefly summarized. The floor pan member 31 is preferably formed from thin steel sheet which during the roll forming process is a substantially continuous sheet supplied from a large coil. The width of the steel sheet is selected based on the desired transverse finished dimension of the pan member 31 so as to permit creation of the transversely corrugated floor pan including formation of the side edge flanges 58. The initial width of the flat steel sheet, as provided in the coil, thus substantially corresponds to the width of the finished floor pan member 31 if flattened out into a planar condition.

The flattened steel sheet is supplied from the coil into a roll-forming mill which, in a conventional and known manner, progressively reforms the flat steel sheet as it passes through the mill so that, upon leaving the mill, the steel sheet is longitudinally corrugated so as to have a cross section substantially as illustrated by FIG. 7. The continuous corrugated sheet is then fed to a cut-off press which cuts the continuous corrugated sheet at desired spaced distances corresponding to the desired lengths of the finished floor pan member 31. The separated floor pan member 31 has side portions which are free of wheelwell openings, and hence substantially correspond to FIG. 6. The separate roll-formed pan member is then moved into a forming station which effects notching of the modified wheelwell openings 41' (FIG. 8) into opposite side portions of the pan member, which notching operation effectively removes a side central portion of the corrugated pan member to thereby result in formation of the opening 41'. Following the notching operation the pan member, having the modified wheelwell openings 41' formed in opposite sides thereof, is then subjected to a pressing operation which effects cold working and hence downward deformation of the flanges and tabs 58, 61, 62, 63 and 64 to thereby provide a monolithic one-piece roll-formed corrugated floor pan 31 substantially as illustrated in FIG. 4. This floor pan 31 is thus generally in condition for securement to the cross rails 32, 33 and 34 in a conventional manner, typically by means of spot welds which are provided at the locations where the cross rails contact the base walls 54, 57 and 59.

The rear cross rail or sill 32 is preferably provided with a plurality of sidewardly-spaced protrusions 66 projecting upwardly therefrom, which protrusions are sized and positioned so as to project upwardly into the rearward ends of the ribs 51, 55 and 56, preferably directly adjacent the rear free edge of the pan member, so as to close off the rearward ends of the ribs and provide for supportive reinforcement of the ribs directly adjacent the rear edge of the bed. The protrusions 66 and their cooperation with the rear ends of the ribs can be generally in accordance with the disclosures contained in Assignee's prior U.S. Pat. Nos. 5,188,418, 5,544, 932 and 5,575,525 as described above.

Figure 10:
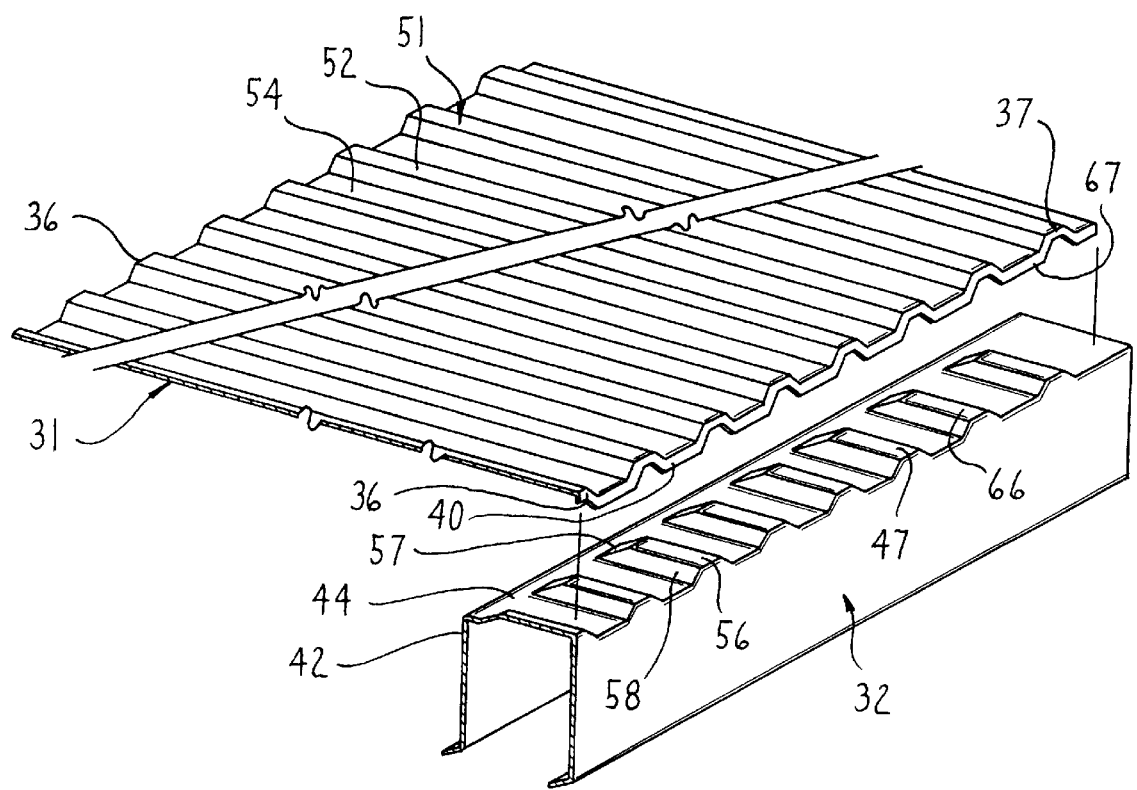
FIG. 10 is an exploded, fragmentary perspective view showing the rear of the pan member and its relationship to the rear sill.
Figure 15A:
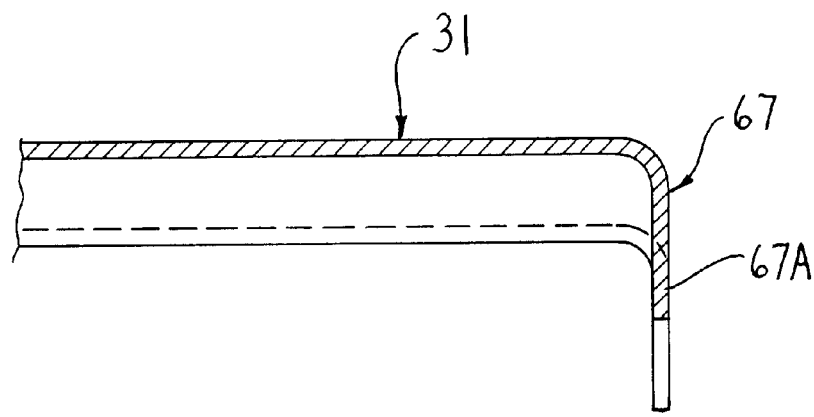
FIGS. 15A and 15B are enlarged, fragmentary sectional views showing the flanges as formed on the respective rear and front edges of the bed member.

Alternately, and preferably, the rearward free edge of the pan member 31 is provided with a downwardly deformed flange 67 (FIGS. 10 and 15A) associated therewith and extending along the rear edge thereof. This rear flange 67 extends longitudinally along the entire length of the rear edge of the pan member and has an undulating configuration which corresponds to the corrugated cross section of the pan member. This flange 67 is positioned so as to project downwardly in overlapping relationship directly adjacent rear surfaces on the protrusions 66 and on the rear sill 32. This rear flange 67 preferably includes a rounded or arcuate portion which joins to the rear edge of the pan member and which is then smoothly curved downwardly for joining to a generally vertically projecting flange part 67A which overlaps the rear of the rear sill 32, with this latter flange part 67A terminating in a free edge. This rear flange 67 is disclosed and described in Assignee's copending U.S. application Ser. No. 08/661 062.

Figure 15B:
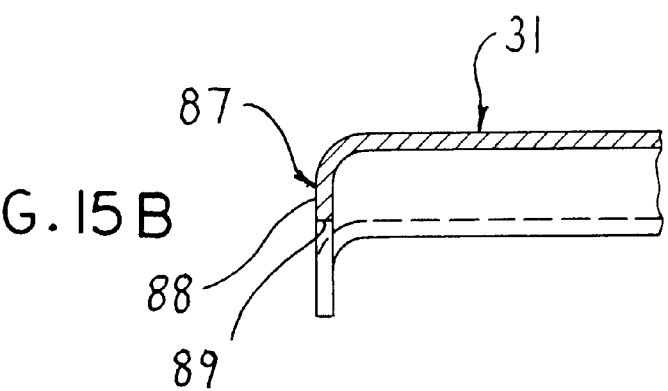

The bed member 31 of the invention, in a preferred embodiment, is also provided with a downwardly deformed flange 87 (FIG. 15B) extending longitudinally therealong. This front flange 87 is constructed similar to the rear flange 67 in that it is integrally formed with and deformed downwardly from the plane of the bed member so as to provide additional reinforcement for the bed member due to the extension of this flange 87 across the front edge thereof. This front flange 87 is of a forwardly and downwardly rounded configuration so as to define a generally rounded front corner, with this rounded corner terminating in a generally lower but vertically planar flange part 88 which in turn defines a free edge 89. This generally vertically planar flange part 88 is adapted to generally abut against the front side wall 15 (FIG. 3) of the truck bed and can be fixed thereto, as by spot welding. Further, the shape of this front flange 87 and its cooperation with the adjacent vertical front wall 15 of the truck bed result in creation of a generally upwardly-oriented V-shape groove which extends longitudinally along the entire front edge of the pan member. This latter groove is used as a caulk-receiving groove to permit sealing of the pan member to the front wall.

The one-piece monolithic bed member 31 of the present invention, as illustrated by FIGS. 4 and 5, also preferably has a small notchlike opening 68 formed inwardly from one of the longitudinally-extending side edges thereof in longitudinally spaced relation from the respective wheelwell opening 41. This opening 68, which extends vertically through the side flange 58 and at least part of the edge rib 56, is sized so as to accommodate therein the externally-accessible fuel filling pipe which connects to the fuel tank of the vehicle. This notch 68 is preferably notched from the roll-formed pan member simultaneous with the formation of the adjacent notched wheelwell opening 41'.

Figure 11:
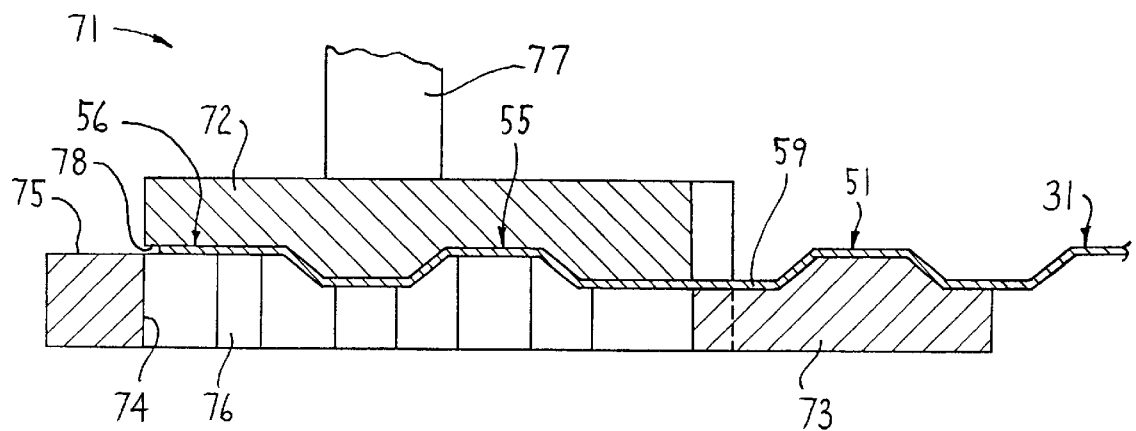
FIG. 11 is a enlarged fragmentary sectional view illustrating upper and lower punch members used for effecting notching of the wheelwell opening in the roll-formed pan member as illustrated in FIG. 8, the cross section of the lower support member being taken generally along line 11—11 in FIG. 12.
Figure 12:
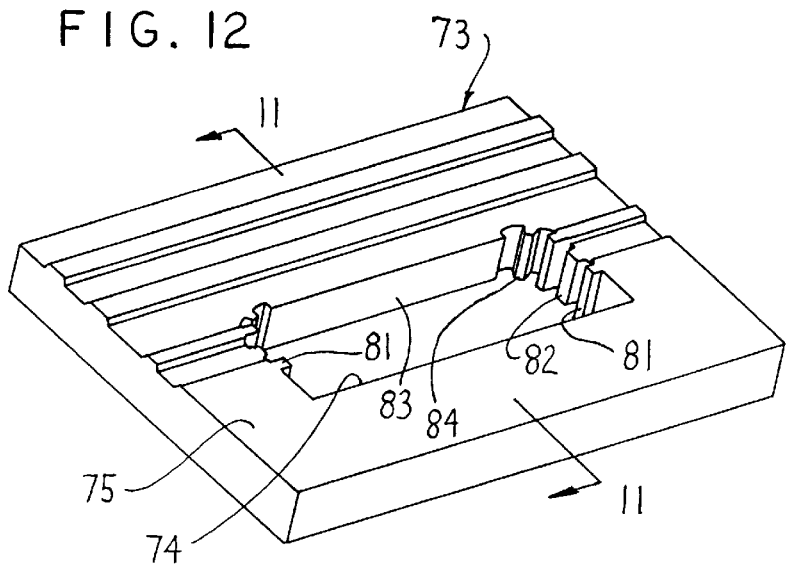
FIG. 12 is a perspective view illustrating the lower support member used in notching the wheelwell opening.

To effect notching of the intermediate wheelwell opening 41' as illustrated in FIG. 8, there is provided a notching arrangement 71 (FIGS. 11 and 12) which is designed specifically to cooperate with the roll-formed corrugated configuration of the pan member. This notching arrangement 71 includes respective upper and lower notch members 72 and 73 which cooperate to effectively sandwiched the side portion of the pan therebetween as illustrated in FIG. 11, prior to actual formation of the opening 41'. The lower member 73 is preferably stationarily supported on a suitable support frame (not shown), and is provided with an opening 74 vertically therein, the configuration of the opening 74 corresponding generally to the configuration of the wheelwell opening 41'. The upper surface 75 of the lower member 73 has a corrugated configuration which generally corresponds to the transverse corrugated or ribbed shape defined by the bottom surface of the pan member adjacent one longitudinally-extending side edge thereof so that the lower member 73, at least adjacent the front and rear edges of the wheelwell opening and also along the longitudinally-extending inner edge thereof, supportively engages the underside of the ribs 55 and 56 as well as the base walls 57 and 59. This lower member 73 also has appropriate cantilevered support tongues 81, 82, 83, 84, which are positioned and shaped corresponding to the flanges 61, 62, 63 and 64, respectively.

The upper notch member 72 is sized and positioned so as to be disposed directly over the opening 74 in the lower member 73, and the upper notch member 72 is connected to a vertical driving device 77 which effects downward movement of the upper member 72 into the opening 74 so as to effect creation of the opening 41'. The upper member 72 has a outer generally U-shaped edge which generally corresponds to the shape of the opening 41' to thus effect shearing or punching of the roll-formed edge portion of the pan member to effect formation of the opening 41'. The bottom surface 78 of the upper member 72 is also provided with a corrugated or ribbed configuration which generally corresponds to the corrugated upper surface of the engaged area of the pan member 31, substantially as illustrated by FIG. 11, so that the downward movement of the upper member 72 effects substantially simultaneous punching of the pan member around the entirety of the opening 41'. The top and base walls, as well as the interconnecting side walls, are thus all substantially simultaneously punched so as to create the opening 41'. This simultaneous notching of the entire non-uniform edge of the opening 41', together with the accompanying supportive engagement provided by the lower member 73 around the entirety of the edge of the opening 41', together with the pressing engagement provided by the upper member 72 around the entirety of the inner perimeter of the opening 41', permits the opening 41' to be accurately formed without creating any significant dimensional change or deformation of the pan member in the vicinity of the opening 41', particularly where the ribs 55 and 56 terminate at the front and rear edges of the wheelwell opening.

Further, by provision of the increased width W3 of the base wall 59 and the positioning of the longitudinally-elongate inner edge 42 of the wheelwell opening therealong, this wider base wall 59 contains sufficient material to also permit formation of the flanges 63 and 64 therefrom, and in fact all of the flanges 61–64 are formed from horizontally planar walls of the pan member, even though sloped side walls 53 of the ribs are sidewardly interposed between some of the flanges, such as the rib side wall which is disposed between the flange 62 and the flanges 61 as disposed on opposite sides thereof.

Figure 13A:
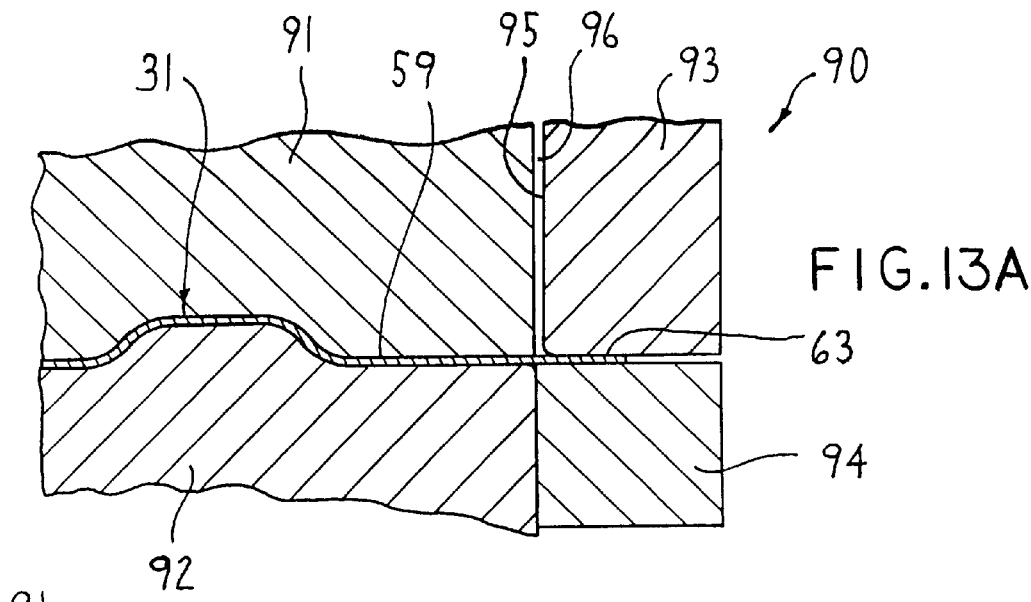
FIGS. 13A, 13B and 13C are fragmentary sectional views which illustrate the process for forming the attachment or securing flanges associated with edges of the roll-formed pan of this invention, with FIG. 13A showing the flange following the roll forming thereof and prior to forming of the flange, FIG. 13B showing the flange in a partially formed position, and FIG. 13C showing the flange in its fully formed position.
Figure 13B:
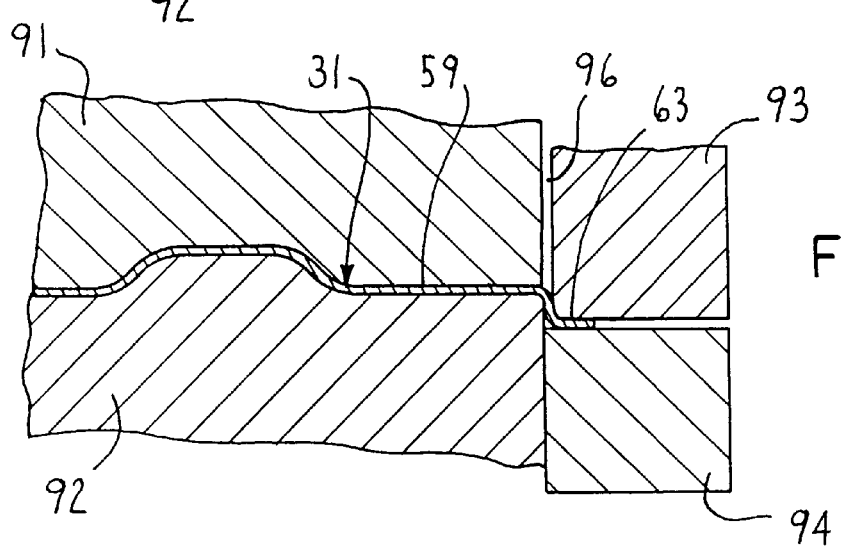
Figure 13C:
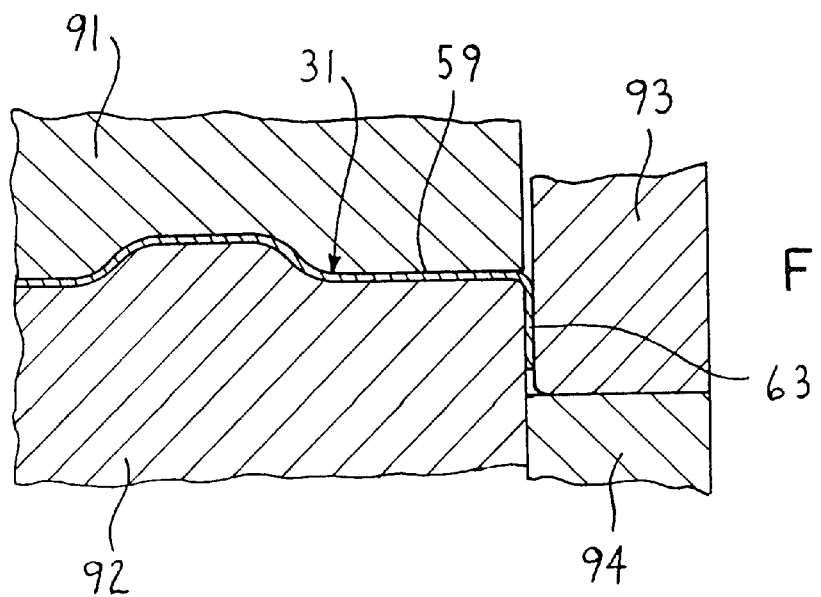

Referring now to FIGS. 13A–13C, there is diagrammatically illustrated the process for forming the edge flanges which are associated with the longitudinal side edges and the wheelwell openings, such as the flanges 58, 61, 62, 63 and 64. FIGS. 13A–13C illustrate the formation of the flange 63 which extends along the longitudinally-extending inner edge of the wheelwell opening, but it will be appreciate that the arrangement and process illustrated by these figures are also applicable to the other flanges.

Referring specifically to FIG. 13A, the roll-formed bed member 31 is positioned in a flange forming apparatus 90 which includes upper and lower supports 91 and 92 which clampingly engage therebetween that portion of the pan member 31 adjacent the flange, such as the flange 63, with the flange being positioned so as to project in cantilevered fashion outwardly beyond the supports 91 and 92. A pair of movable forming or wiping members 93 and 94 are disposed adjacent the supports for supportive engagement with the respective upper and lower surfaces of the projecting flange 63. The flange 63 is closely but transversely slidably confined between the opposed faces of the moveable wiping members 93 and 94, and the upper wiping member 93 has an inner face or surface 96 which is spaced from an opposed side face of the adjacent upper support 91 so as to define a small vertically extending gap 96 therebetween, which gap has a dimension which closely approximates the thickness of the flange 63. To effect downward deformation of the flange into a position wherein it projects downwardly in perpendicular relationship to the plane of the pan member, the wiping or forming members 93, 94 are synchronously moved downwardly by a driving device (not shown) which maintains the opposed faces thereof closely spaced so as to confine the flange 63 therebetween. As these forming members 93, 94 are moved downwardly, however, this downward movement and the presence of the gap 96 are such that the flange 63 starting at its juncture with the main pan member is progressively deformed downwardly along the flange toward the free end thereof, this in actuality being a cold working of the metal similar to a roll-forming technique. The wiping members 93 and 94 are thus moved downwardly through a sufficient stroke until the flange 63 is deformed or drawn downwardly to its free end or tip and hence effectively is totally pulled out of the gap between the wiping members 93, 94 and assumes an entirely perpendicular relationship as illustrated by FIG. 13C.

With the formation of the flange by actual progressively deforming or cold working the flange from the junction point with the pan, to the tip end of the flange, this thus enables the thickness of the flange including at the corner connection to the pan member to be maintained uniform, and also effectively sufficiently reworks the metal of the flange such that when the pan member 31 is removed from the forming apparatus 90, the flange 63 will accurately retain its downwardly projecting perpendicular relationship and will not experience any significant spring back or deformation due to residual stresses created in the flange.

By forming all of the flanges (i.e. flanges 58, 61, 62, 63, 64, 67, 87) by means of a deforming cold working process similar to that illustrated by FIGS. 13A–13C, the flanges hence all possess properties which are generally equivalent to the roll-formed properties of the pan, and result in the flanges having a significantly higher degree of dimensional accuracy so as to greatly facilitate the positioning of the pan on the vehicle and the welding of the pan to the vehicle side walls and wheelwell housings due to the accuracy of manufacture achieved by this invention.

Figure 14:
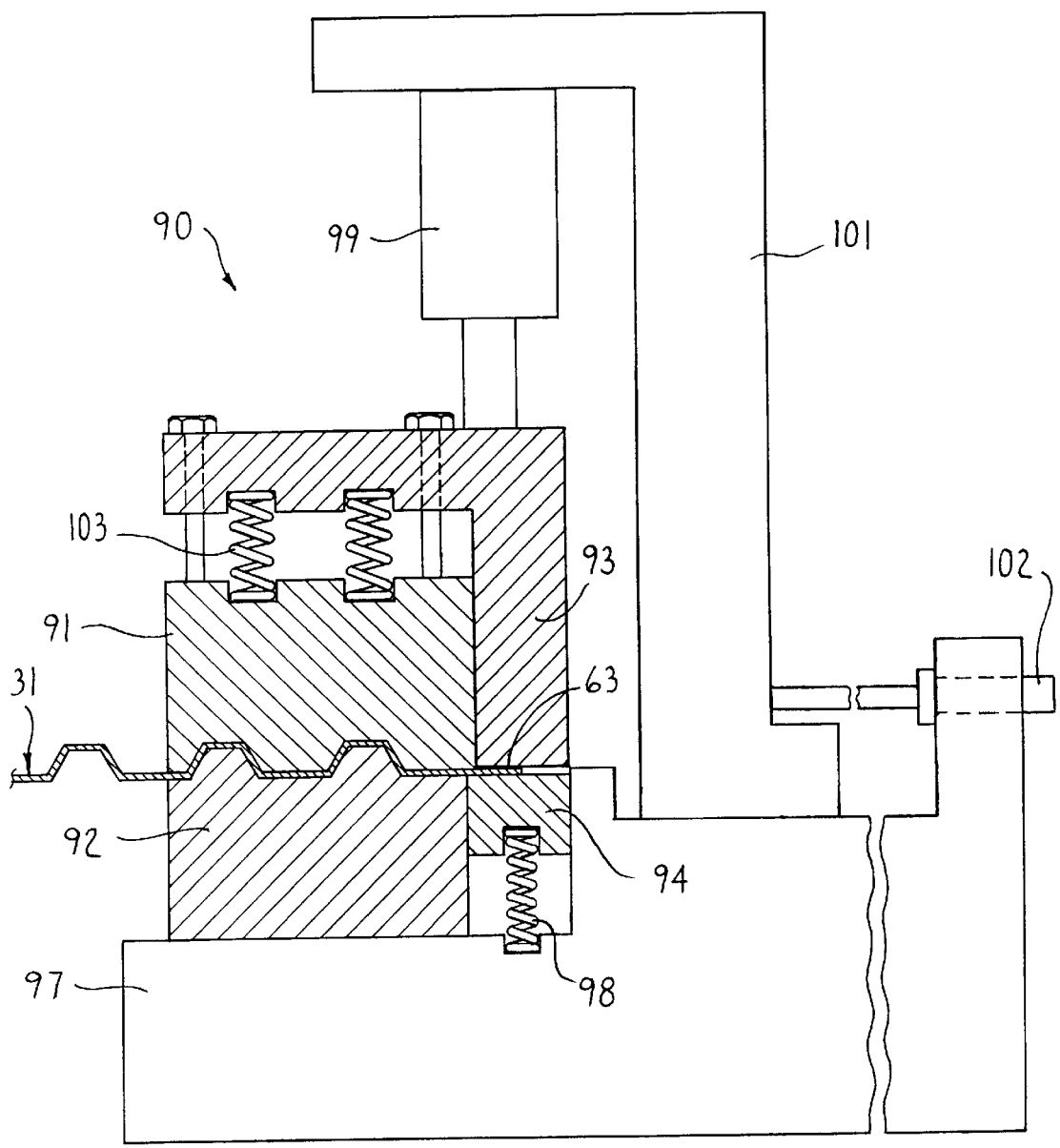
FIG. 14 is an elevational view, partially in cross section, which diagrammatically illustrates the flange forming arrangement for effecting drawing of an edge flange on the bed member consistent with the forming sequence illustrated by FIGS. 13A through 13C.

The overall flange forming apparatus 90 is diagrammatically shown in greater detail in FIG. 14 wherein there is illustrated the lower support 92 being stationarily provided on a base or support frame 97, with the wiping member 94 being movably supported on the base 97 and resiliently urged upwardly by a suitable spring 98. The upper wiping member 93 is coupled to the lower end of a driving device 99, such as a variable speed fluid pressure cylinder, the housing of which is mounted on a top slide 101, the latter being horizontally slidably supported on the base 97. The top slide 101 can be movably displaced inwardly toward the bed member 31 so as to be disposed in a position for cooperation therewith substantially as illustrated by FIG. 14, and when not in use the slide 101 can be retracted outwardly (rightwardly in FIG. 14) so as to not be disposed over the bed member so that the latter can be suitably vertically raised by an appropriate lift-and-carry conveying system. A suitable driving device 102 such as a pressure cylinder cooperates between the base 97 and slide 101 to control the horizontal movement of the latter. Springs 103 are also preferably provided between the top support 91 and the top wiping member 93 to maintain the support 91 clampingly engaged with the upper surface of the bed member 31, while at the same time enabling the top slide 93 to move downwardly to effect drawing or forming of the flange substantially in the manner illustrated by FIGS. 13A–13C.

While FIGS. 13A–13C illustrate forming of a flange with a rather sharp corner, it will be appreciated that this same process and apparatus can be used for forming a flange having a more rounded corner, such as the rear flange 67 or the front flange 87, which more rounded corner is accommodated by providing a more rounded forming corner on the lower support 92.

Figure 17:
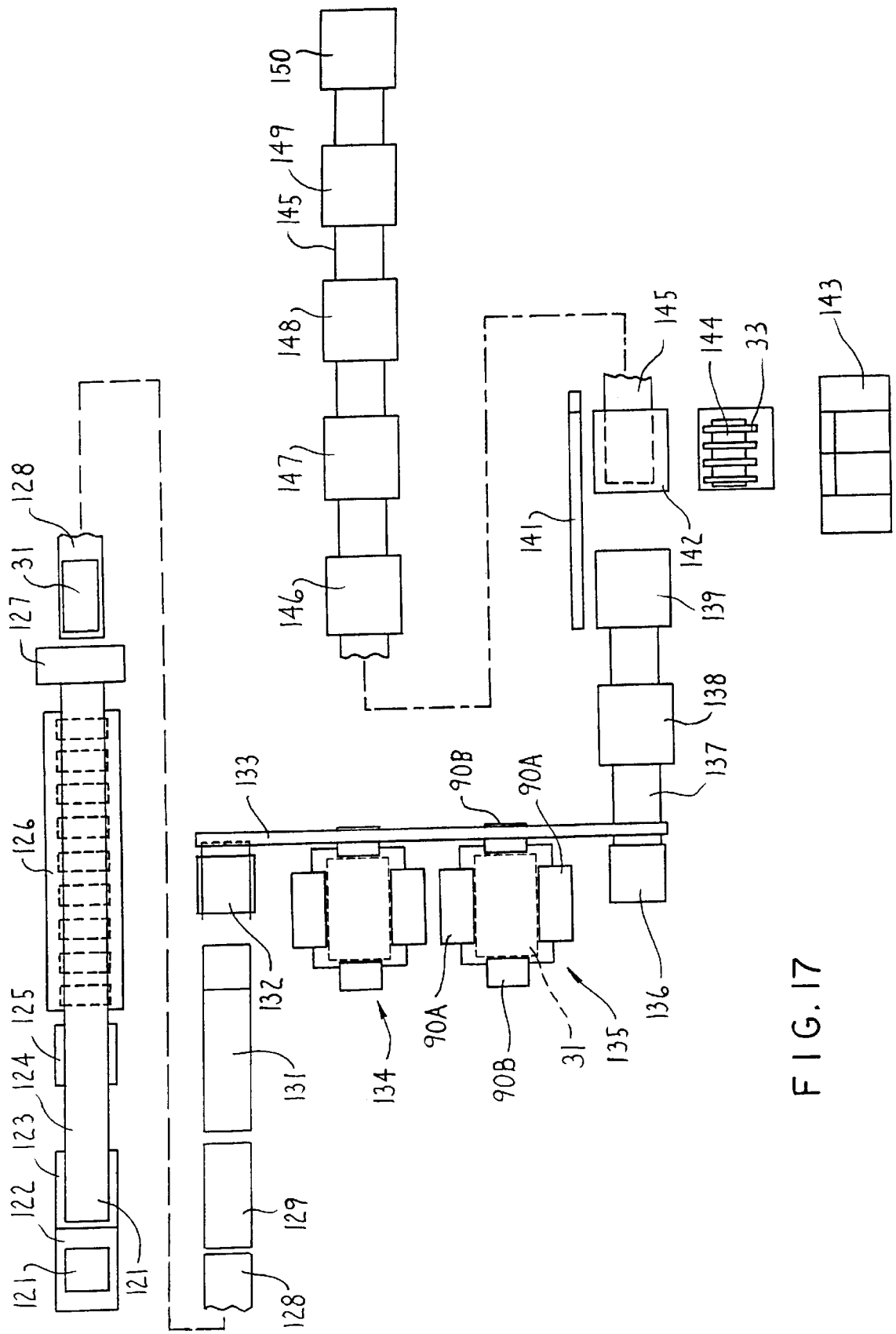
FIG. 17 is a diagram which diagrammatically illustrates the forming equipment and process used for forming of the bed member and the subsequent securement thereof to the cross rails.
Figure 18:
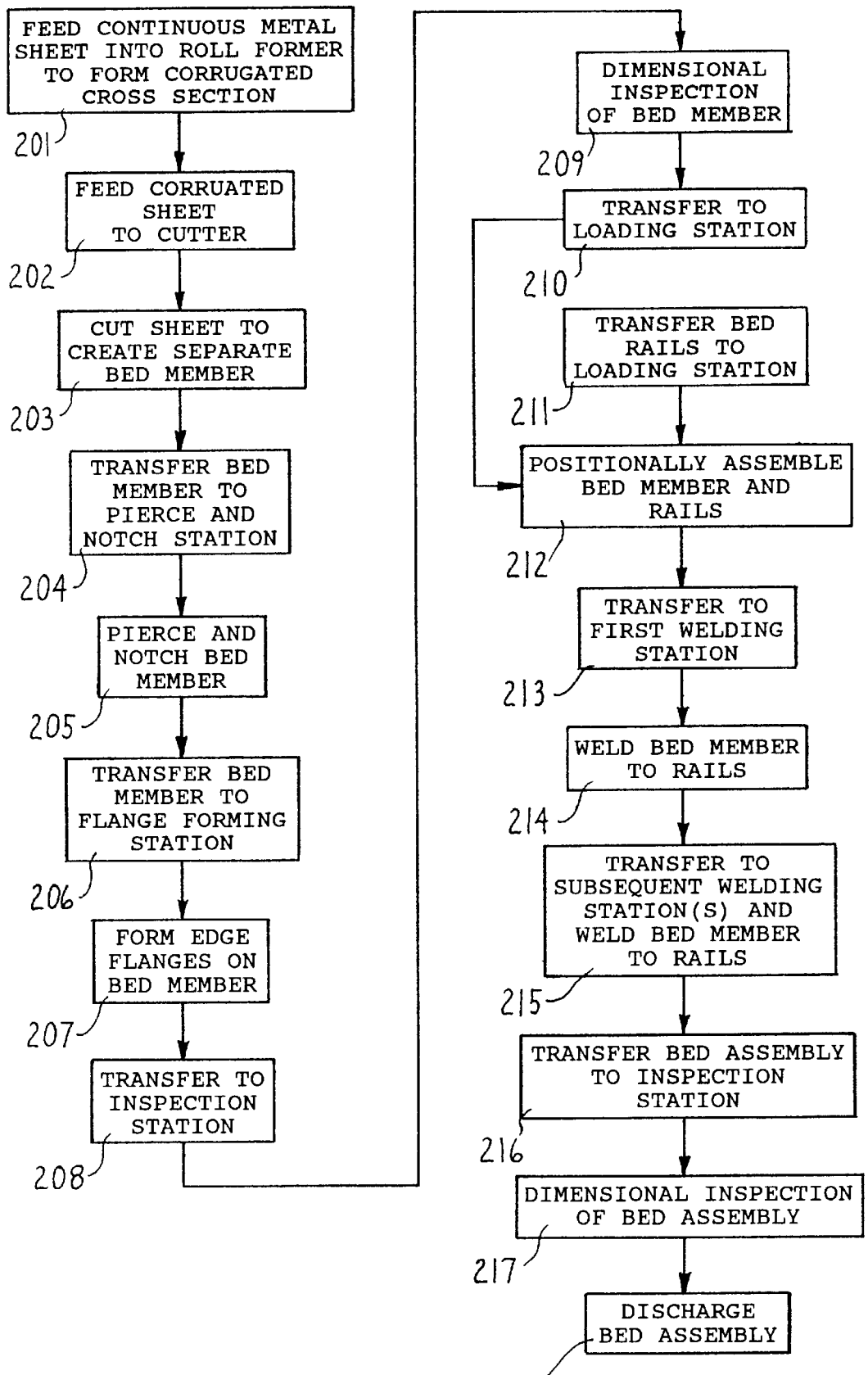
FIG. 18 is a flow process chart which describes the primary processing sequence associated with forming of the bed member and subsequent attachment of rails thereto.

The process and apparatus for permitting overall forming of the pan member 31, and the attachment thereof to the cross rails 32–34 to effectively create a bed assembly, will now be described with reference to the diagrammatic plan view of FIG. 17 and process chart of FIG. 18.

The main floor pan 31 is formed from thin sheet steel which during the forming process is a substantially continuous sheet supplied from a large coil. The width of the sheet steel is selected based on the desired finished dimension of the formed floor pan 31 so as to permit creation of the corrugated floor pan including formation of the side edge flanges 58 thereon, whereby trimming of the sheet or finished pan is unnecessary. The initial width of the flat steel sheet, as provided in the coil, thus substantially corresponds to the width of the finished floor pan if flattened out into a planar condition.

The steel sheet is normally supplied in the form of a large coil 121 as provided on a coil feed rack 122 which can be positioned adjacent a cradle 123 onto which the coil 121 can be transferred for support during the manufacturing operation. The cradle 123 has conventional structure associated therewith to effect strengthening of the sheet material as it is discharged therefrom in the form of a substantially continuous sheet 124. The sheet material is feed through a combined end shear-welder 125 which trims the leading and trailing ends of each coil and welds the trimmed trailing end of one coil to the leading trimmed end of the next coil to permit a substantially continuous sheet 124 to be fed into and through the subsequent manufacturing stations.

After passing through the shear/welder 125, the continuous sheet steel 124 progressively moves through a roll mill 126 which progressively reforms the steel sheet so that, while the steel sheet is substantially flat when entering the leading end of the roll mill 126, the steel sheet is suitably formed so as to have the finished cross section of the floor pan 31 when leaving the discharge end of the roll mill 126. This progressive reforming of the steel sheet as it passes through the mill 126 is diagrammatically illustrated by the progressive decreasing width of the steel sheet as it moves longitudinally through the mill 126.

Upon leaving the roll mill 126, the continuous steel sheet 124 has now been formed so as to have the corrugated cross section of the pan 31 substantially as illustrated by FIG. 7, which corrugated cross section includes the flange parts 58 extending longitudinally along opposite sides of the floor pan, which parts 58 are substantially horizontally coplanar with either the top or bottom walls of the corrugated pan. These parts 58 are subsequently deformed to permit formation of the downwardly-projecting side flanges 58 as described hereinafter.

The continuous corrugated sheet as discharged from the roll mill 126 is fed into and through a conventional cut-off press 127 which cuts the corrugated steel sheet at desired spaced distances substantially corresponding to the desired length of the finished floor pan 31. The now separated floor pan 31 is then transferred to conveyors 128 and 129, which conveyors effect a speed-up in the velocity of the separate floor pan 31 downstream of the cut-off press 127 to effectively separate it from the leading edge of the continuous roll-formed sheet 124.

The conveyor 128-129 moves the separated floor pan 31 to a transfer device 131 which moves the pan member 31 to a transfer station 132, the latter cooperating with one end of a transfer conveyor 133, such as a conventional overhead lift-and-carry conveyor. This conveyor 133 can engage and lift the bed member 31 located at the transfer station 131 and move the member sidewardly, that is in a direction generally perpendicular to the longitudinally extending direction of the bed member. This conveyor 133 shifts the bed member 31 to a press station (i.e. a notching and piercing) 134 where secondary stamping operations are carried out on the pan member, which secondary stamping operations primarily include piercing and notching of the pan member. After completion of the desired stamping operations at station 134, the pan member is then transferred as by the transfer device 133 to the next station 135, this being a flanging station for permitting creation of the downwardly turned flanges associated with the side, front and rear edges of the bed member. Upon completion of this flange forming operation, the roll-formed bed member 31 is now substantially completed, and is moved by the transfer mechanism 133 to a direction changing station 136. At this station 136 the pan member is positioned on a conveyor 137 which advances the pan member to an inspection station 138 whereat the dimensions of the finished pan member are inspected, such as by use of laser inspection devices. The conveyor thereafter advances the pan member to a dwell station 139, from which the pan member is engaged and forwardly advanced by a further conveyor 141, such as a conventional overhead lift-and-carry conveyor. The latter conveyor advances the pan to a loading assembly station 142 for positional assembly of the bed member to the cross rails 33–34. For this purpose, the cross rails 33–34 can be stored in racks such as diagrammatically illustrated at 143 with the rails being removed from the rack 143 and positioned on a positioning fixture 144 which is disposed sidewardly of the loading station 142. An appropriate transfer mechanism then automatically transfers the rails from the station 144 to the loading station 142, with the bed member being moved into and properly positioned at the loading station 142 so as to define a proper positional relationship between the rails and bed member. The positionally assembled bed and rail assembly at loading station 142 is then transferred by a conveyor 145 to a first welding station 146 which effects spot welding of the rails to the bed member. The first welding station 146 normally effects spot welding between the rails and the bed member solely along the longitudinally extending center portion of the bed member. The assembly then is transferred to the next welding station 147 which effects further spot welds between the rails and bed member outwardly from the spot welds created at the station 146. The assembly is then transferred to still a further welding station 148 which creates further spot welds between the rails and bed member, these latter spot welds being disposed adjacent the opposite longitudinally extending outer portions of the bed member. The bed assembly is then transferred from weld station 148 by conveyor 145 to an inspection station 149 which carries out a final dimensional inspection of the assembly, again typically by laser sensing devices. The assembly is then discharged by the conveyor to a discharge station 150, from which it can be transferred to suitable conveying devices for supply to a vehicle assembly line, or in the alternative transferred into suitable storage racks or the like.

Figure 19:
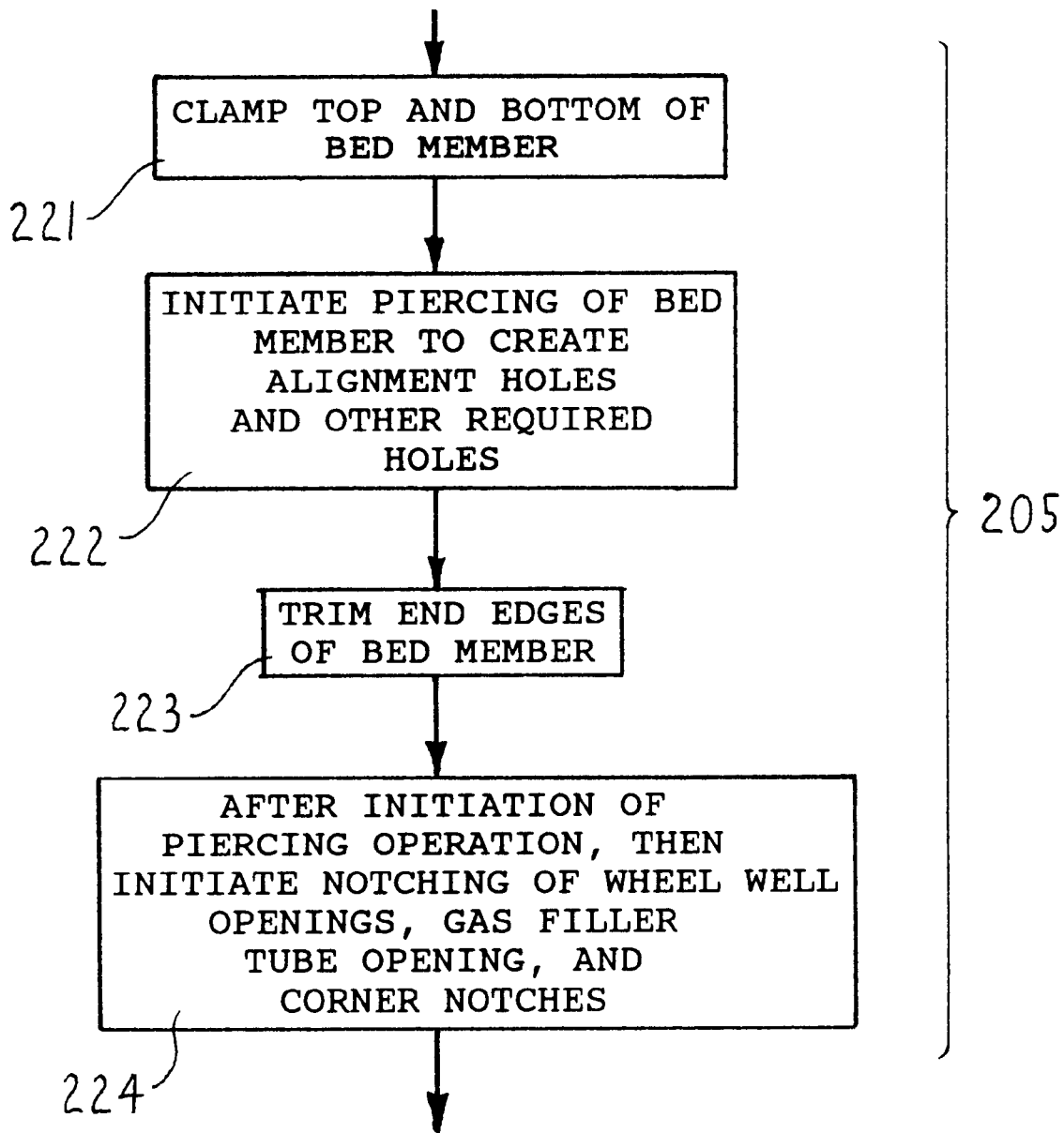
FIGS. 19 and 20 are charts which expand the process steps of FIG. 18.

The forming operations associated with the bed member at the press station 134 will now be described in greater detail, specifically with reference to FIG. 19.

When the roll formed bed member 31 is transferred into the press station 134, it is initially clampingly engaged by top and bottom clamps as indicated at 221, which clamps extend transversely across the upper and lower surfaces of the bed member adjacent at least the opposite ends thereof, with the clamps having a corrugated configuration compatible with that of the bed member to permit secure clamping engagement with the bed member. After the bed member has been suitably clamped at the press station 134, then piercing operations on the bed member are initiated at 222, which piercing operations involve the formation of several holes or openings vertically through the bed member. For example, a pair of cooperating alignment holes 161 and 162 (FIG. 16) are formed through the bed member adjacent one side thereof, with a further such pair of holes being formed adjacent the other side of the bed member in the preferred embodiment. The one hole 161 as disposed adjacent the rear corner is a round alignment hole, whereas the other hole 162 as disposed adjacent the front corner is an elongate slot which is generally aligned with the hole 161. Additional holes can also be formed through the bed member, such as drain holes if desired, the latter being indicated at 163, or in some cases there is a desire to also provide bolt holes (not shown). All of these holes can be substantially simultaneously pierced through the bed member by conventional piercing tools.

Following the piercing, the front and rear end edge are preferably trimmed (i.e., sheared) at 223 to ensure the accuracy thereof.

The bed member is also thereafter subjected to notching operations (step 224) along the peripheral edges thereof while located at the press station 134. For example, and referring to FIG. 16, the wheelwell openings 41 are formed in the opposite longitudinally extending side edges of the bed member, these being created substantially as enlarged notches generally in accordance with an arrangement similar to that illustrated by FIGS. 11–12 as described above. Each rear corner of the bed also has a notch 165 formed therein so as to accommodate the reinforcing post structure associated with the rear end of the truck bed side wall. When the truck bed is being provided with a front flange such as the flange 87 of FIG. 15B, then each front corner of the truck bed is also provided with a small notch 166 therein so as to prevent interference between the front flange 87 and side flanges 58 during the subsequent forming thereof. The fuel filler tube opening 68 is also notched in one of the side walls of the bed. All of these notches are formed substantially simultaneously using shear-type notching tools configured so as to provide the desired notch profile.

It is preferred to first initiate the aforementioned piercing operation, with the piercing operations being at least partially completed before initiating the notching operation so as to minimize the amount of material distortion force which is simultaneously applied to the bed member. Further, by initiating and at least partially completing the piercing operations prior to initiating the notching operations, the piercing tools can be maintained in secure gripping engagement with the bed member and thus assist in maintaining the rigidity of the bed member as the notching operations are being performed.

Figure 16:
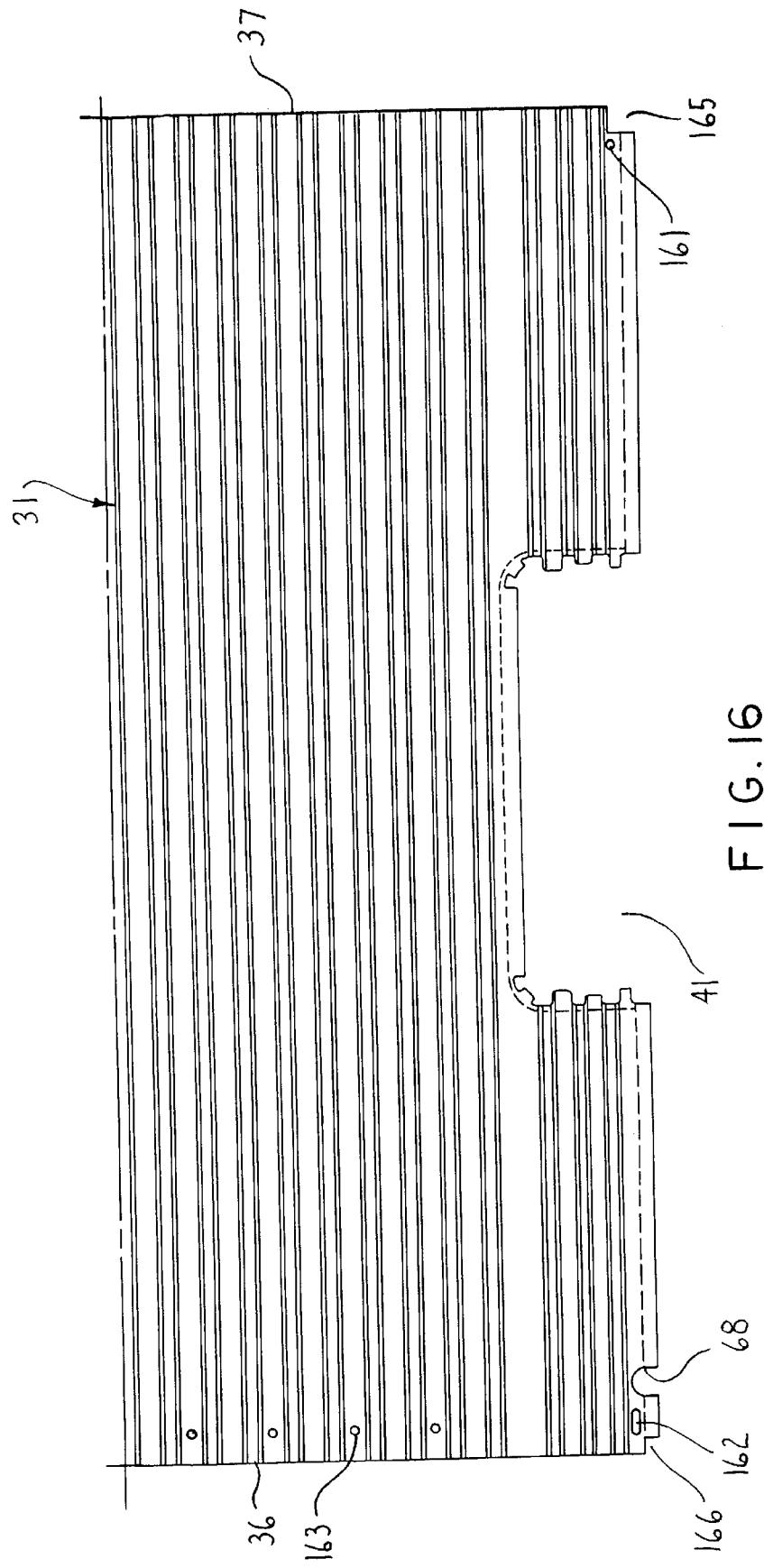
FIG. 16 is a top plan view showing one-half of the bed member following the treatment thereof at the notching and piercing station, it being recognized that the bed member is generally symmetrical about the longitudinal central axis thereof.

After all of the piercing and notching operations have been performed at the press station 134, the roll formed bed member will have an appearance similar to that illustrated in FIG. 16, which bed member has not yet been subjected to any drawing or wiping operations for forming the downwardly projecting edge flanges.

Figure 20:
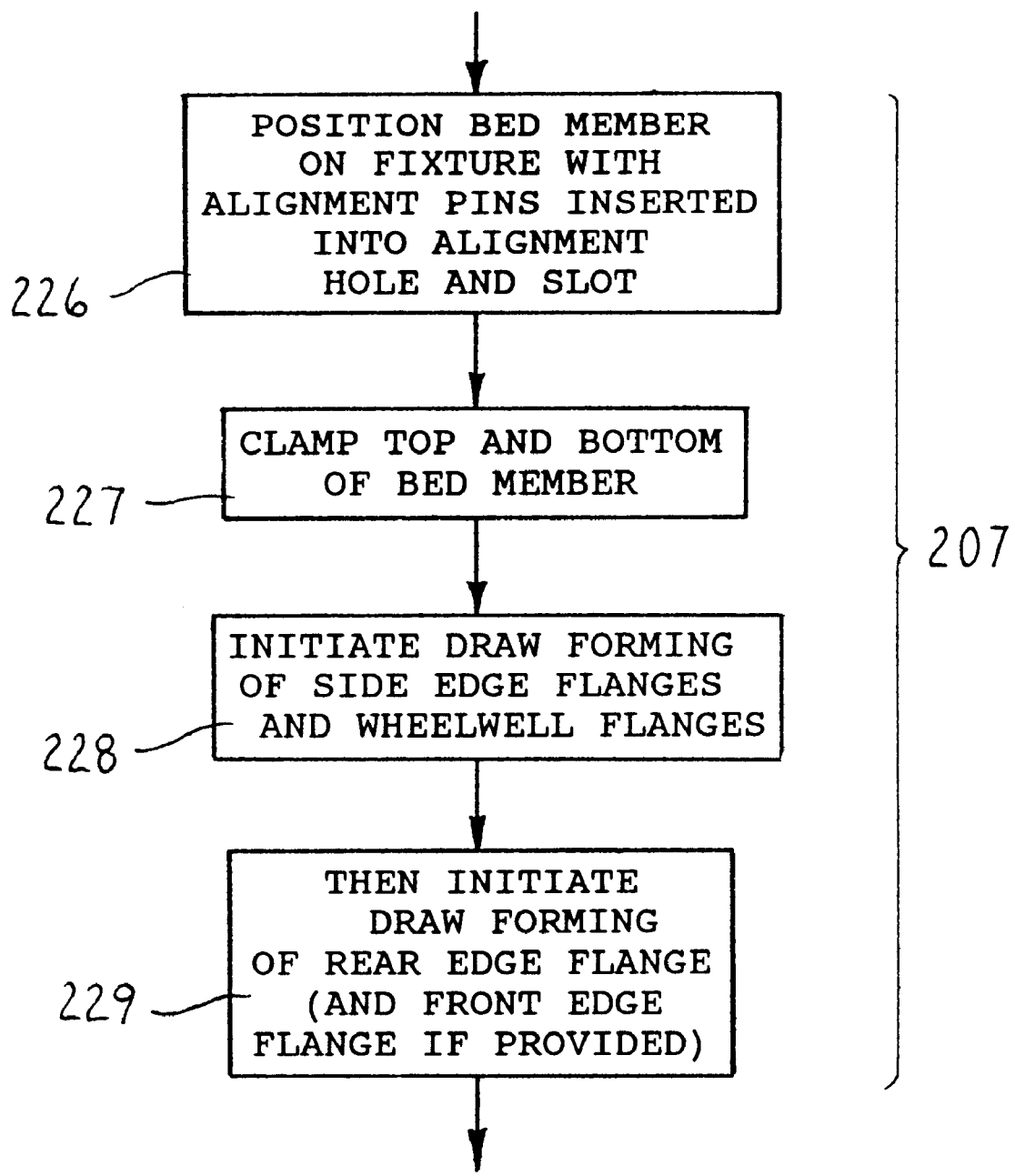

The bed member in the condition illustrated in FIG. 16 is transferred from the press station 134 to the flange forming station 135 so as to effect downwardly drawing or wiping of the various edge flanges. As the bed member is moved into the flange forming station 135, it is initially accurately positioned due to a pair of upwardly projecting alignment pins at the station 135 being inserted through one of the alignment holes 161 and its corresponding alignment slot 162 (step 226 of FIG. 20). This thus provides for precise positioning of the bed member at the flange forming station 135. The bed member is then suitably clamped (step 227) by top and bottom clamp members to facilitate the stationary securement of the bed member.

Thereafter the flange forming devices 90A (FIG. 18) as disposed adjacent opposite side edges of the bed member are activated (step 228) so as to effect downward drawing or wiping of not only the side flanges 58, but also of the flanges 61–64 associated with the wheelwell openings. These flanges are wiped or drawn downwardly in a cold working fashion by the arrangement 90 which is illustrated generally by FIGS. 13 and 14 as described above.

After the side edge flanges have been drawn downwardly, then the side flange forming apparatus 90A are maintained in the extended position so that the opposite side flanges are effectively held in the respective drawing apparatus, substantially as illustrated in FIG. 13C, and then the front and rear flange forming apparatus 90B are activated (step 229) to effect forming of the rear flange 67 and front flange 90. Since the rear flange extends along the corrugated configuration of the roll formed bed member and requires imposition of greater forming force in order to effect downward drawing of the flange, the maintaining of the bed member sidewardly clamped between the side flange formers 90A provides additional overall securement and rigidity to the bed member during the rear flange forming operation. After the front and rear flanges have been suitably formed, then all of the flange forming apparatus 90A and 90B are retracted upwardly, and then retracted horizontally outwardly away from the bed member, following which the bed member is then lifted and transferred to the next station 136.

If the bed is not being provided with a front flange, then the front flange forming apparatus 90B is either omitted or not activated. Further, while the invention as described above relates to forming of the front flange by a wiping or drawing process, and while such is preferred, nevertheless the structure of the front flange is less critical and such flange can be formed by a conventional bending operation if desired.

During the subsequent transfer of the bed to and between the weld stations, the alignment holes 161 and slots 162 are utilized to ensure proper positioning of the bed member both during the transfer between stations and for positioning at the work station. For example, each of the welding station is provided with a pair of upwardly projecting alignment pins which engage the hole 161 and slot 162 associated with one side of the bed member to ensure proper positioning of the bed member at the welding station. On the other hand, during transfer of the bed member to or between the weld stations, the alignment hole and slot 161–162 provided adjacent the other side of the bed member cooperate with alignment pins associated with a walking beam shuttle which is part of the lift-and-carry transfer conveyor 45 so as to maintain proper positioning of the bed member during transfer thereof between adjacent workstations.

The welding of the cross rails or sills to the bed member, as depicted by the stations 146–148, is generally conventional.

While the invention as described above relative to the one-piece monolithic pan 31 contemplates that the roll-formed member will be formed from sheet steel, it will be appreciated that the invention also permits the floor pan member to be formed from laminated sheet material such as sheet steel having a plastic sheet layer laminated over the top thereof since such construction may eliminate the need for a separate bed liner.

It will also be appreciated that while the invention as described above references the upward formation of the stiffening ribs from the flat sheet material, it will be appreciate that the relative deformation of the sheet material and forming of the ribs is such that the original planar sheet material can in actuality define the flat top walls of the ribs, and that the actual deforming of the sheet material can be a downward deformation of the valleys between the ribs.

While the invention has been described for use on and is particularly adaptable for use on a pickup truck, it will be appreciated that the invention is also particularly adaptable for use on other vehicles which require a similar bed construction, such as vans and sport utility vehicles.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A process for forming a bed assembly for a vehicle, comprising the steps of:

providing a wide and horizontally elongate continuous flat sheet of thin metal supplied as a continuous coil;

roll forming said continuous flat metal sheet as unwound from said coil to define a plurality of generally parallel, sidewardly-spaced, channel-like stiffening ribs therein with said stiffening ribs extending lengthwise of the formed metal sheet and then transversely cutting the formed sheet to define a monolithic one-piece load bearing vehicle floor pan, said stiffening ribs being disposed in parallel and sidewardly-spaced relation so as to extend generally across the entire width of the metal sheet between opposite longitudinally-extending side edges thereof;

thereafter forming a pair of wheelwell openings in said floor pan so that said openings project vertically through the floor pan and open inwardly in generally opposed relation from said opposite side edges, said wheelwell openings projecting inwardly so as to transversely intersect at least one of said channel-like stiffening ribs; and then fixedly securing said floor pan to at least one support sill which is disposed under and supportingly engaged with a bottom side of said floor pan.

2. A process according to claim 1, wherein the step of roll forming said flat metal sheet includes roll forming said stiffening ribs at a uniform height so as to create uniform depth valleys therebetween throughout the length of said floor pan.

3. A process according to claim 1, including the step of deforming, after forming of the channel-like ribs in said sheetlike members, said ribs at said rear free edge over a short longitudinal distance to define a flat, transversely continuous and generally planar rear flange which extends transversely of the floor pan and defines the rear free edge thereof.

4. A process according to claim 1, including the step of forming, simultaneous with the forming of said wheelwell openings, a plurality of flanges which are generally coplanar with and are cantilevered outwardly from the floor pan and project into the region of the wheelwell opening; and thereafter deforming said flanges downwardly in generally transverse relation to the floor pan for subsequent securement to a wheelwell shroud.

5. A process according to claim 4, including the step of forming, during forming of the channel-like ribs in said sheetlike member, a pair of longitudinally elongate side flange parts which extend longitudinally along and define the opposite side edges of said pan member with said side flange parts being generally coplanar with one another and generally parallel with the plane of the sheet material; and thereafter deforming said side flange parts downwardly into generally perpendicular relationship to the plane of the sheet metal to define longitudinally extending side edge flanges for permitting securement of the pan member to the vehicle, said side edge flanges being deformed downwardly after formation of the wheelwell openings.

6. A process according to claim 5, wherein, prior to deforming said flanges and side flange parts, stationarily holding said floor pan between upper and lower supports which mate with a respective upper and lower surface of the formed floor pan, and thereafter engaging at least one of the flanges and side flange parts between movable wiping members and draw forming at least one of the flanges and side flange parts transverse to the floor pan.

7. A process according to claim 5, wherein said side edge flanges and the wheelwell flanges are all substantially simultaneously deformed downwardly.

8. A process according to claim 7, including the step of, after said rib forming step but prior to said wheelwell opening forming step, piercing said pan member at adjacent corners thereof to define a plurality of positional locator holes therethrough.

9. A process according to claim 7, including the step of forming a downwardly directed rear flange on and extending along the rear free edge of said pan member, said rear flange being deformed downwardly subsequent to the downward deforming of said side edge flanges.

10. A process according to claim 9, wherein the step of forming the downwardly directed rear flange includes forming the rear flange from a rear integral portion of the formed sheet and forming the rear flange to be substantially planar.

11. A process for forming a bed assembly for a vehicle, comprising the steps of:

providing a wide and continuous flat sheet of thin metal;

roll forming said flat sheet to define a plurality of generally parallel, sidewardly-spaced, channel-like stiffening ribs therein across substantially the entire width, with said stiffening ribs extending longitudinally throughout the entire length of the formed metal sheet as said formed sheet discharges from a rolling mill;

thereafter severing the continuous formed sheet into bed members of predetermined longitudinal length having said stiffening ribs extending longitudinally throughout the entire length thereof so that the bed member has corrugated front and rear free edges thereon;

thereafter notching said bed member to create at least one notchlike opening which extends vertically through said bed member and projects inwardly from at least one of the longitudinally-extending side edges thereof;

thereafter engaging and deforming opposite longitudinally-extending coplanar side edge parts which are defined adjacent and define opposite side edges of said bed member and deforming them downwardly to define downwardly cantilevered edge flanges which project generally transversely with respect to said bed member; and thereafter fixedly securing said bed member in supportive engagement over at least one cross support.

12. A process according to claim 11, including the step of deforming the stiffening ribs over a short longitudinally-extending distance at the rear free edge of the bed member to define a flat, transversely continuous and generally planar rear flange which extends substantially continuously along and defines said rear free edge.

13. A process according to claim 11, wherein the edge flanges are deformed by progressively cold working and deforming the edge flanges initially from the point of intersection between the flange and the bed member and then effectively and progressively deforming the flange downwardly along the length thereof until reaching the free end thereof.

14. A process according to claim 13, wherein said notching step includes notching a pair of wheelwell openings through said bed member so that said wheelwell openings open inwardly in generally opposed relationship from opposite longitudinally extending side edges of the bed member, and simultaneously forming a plurality of flanges which are cantilevered outwardly from and substantially coplanar with the bed member and project into the wheelwell opening.

15. A process according to claim 14, including the step of deforming said wheelwell-opening flanges downwardly relative to said bed member substantially simultaneous with the downward deforming of said edge flanges.

16. A process according to claim 14, including the step of piercing said bed member adjacent a side thereof to create a plurality of openings which extend vertically therethrough, said piercing being carried out prior to the deforming of said edge flanges.

17. A process according to claim 16, including the step of deforming the rear free edge of said bed member to define a downwardly cantilevered rear flange which projects downwardly from said bed member and extends substantially continuously along said rear edge so that said rear flange has a profile which generally corresponds with the corrugated cross section of said bed member, said rear flange being deformed downwardly after initiation of the downward forming of said edge flanges.

18. A process for forming a unitized bed assembly for a vehicle, comprising the steps of:

providing a wide and horizontally elongated flat sheet of thin structural metal;

roll forming said flat sheet to define a plurality of generally parallel, sidewardly-spaced, channel-like stiffening ribs therein with said stiffening ribs extending longitudinally throughout the entire length of the formed metal sheet so as to terminate at and define corrugated front and rear edges of the formed sheet, the formed sheet being approximately rectangular and having longitudinally-extending side edges which extend between said front and rear edges, said plurality of stiffening ribs causing said formed sheet to have a plurality of sidewardly-spaced and longitudinally-extending top wall parts which are alternately positioned between a plurality of generally parallel and longitudinally-extending base wall parts which are positioned vertically downwardly relative to the top wall parts with adjacent longitudinally-extending edges of said base and top wall parts being joined by side legs which extend vertically therebetween;

forming wheelwell openings in opposite side portions of said formed sheet so that each said wheelwell opening has a generally longitudinally-extending inner edge which joins to front and rear edges which extend transversely of the formed sheet and terminate at the respective side edge so that each said wheelwell opening opens sidewardly through the respective said side edge of the formed sheet, said front and rear edges projecting transversely inwardly from the side edge a sufficient extent so as to intersect at least one top wall part and at least one base wall part of said formed sheet;

forming, simultaneous with forming of said wheelwell opening, a plurality of cantilevered attachment tabs which are integrally and monolithicly joined to and are substantially coplanar with at least one of said one base wall and said one top wall and which project beyond the respective wheelwell edge generally into the wheelwell opening, said plurality of tabs including a first tab associated with each of said front and rear edges and projecting generally longitudinally of the bed member away from the respective front and rear edge, and a second tab which projects transversely from said inner edge of said wheelwell opening; and thereafter deforming said first and second attachment tabs so that they project downwardly away from said top and bottom wall parts in transverse relation therewith so as to position the tabs for attachment to a wheelwell housing.

19. A process according to claim 18, wherein the downward deforming of the tabs is accomplished by initially supporting the cantilevered tabs on opposite sides thereof by upper and lower support dies and then simultaneously moving said upper and lower support dies downwardly to effect cold working of the tab progressively from an inner end toward the free end thereof to cause the tab to be deformed into a transverse downwardly-projecting position.

20. A process according to claim 18, wherein the inner edge of the wheelwell opening is formed in and extends longitudinally along said one base wall part, and wherein the roll forming of the sheet is such that said one base wall part has a transverse width which is substantially greater than the width of the base wall parts defined between the stiffening ribs located transversely between the wheelwell openings.

21. A process according to claim 18, wherein the front and rear edges of the wheelwell opening extend intersectingly transversely across at least two said base wall parts with said longitudinally-extending inner edge of the wheelwell opening being formed in one of said base wall parts and having said second attachment tab attached thereto, said one top wall part being positioned sidewardly between said two base wall parts and having said first attachment tabs attached thereto, and forming a third attachment tab coplanar with the other base wall part and projecting longitudinally in coplanar relation therewith from each of the front and rear edges of the wheelwell opening simultaneous with forming of the wheelwell opening.

22. A process according to claim 18, including the step of deforming the stiffening ribs over a short longitudinally-extending distance at the rear free edge of the bed member to define a flat, transversely continuous and generally planar rear flange which extends substantially continuously along and defines said rear free edge.

23. A process according to claim 18, wherein one of said tabs is joined to and is substantially coplanar with said one base wall part and wherein a further said tab is joined to and is substantially coplanar with said one top wall part.

24. A process according to claim 23, wherein the downward deforming of the tabs is accomplished by initially supporting the cantilevered tabs on opposite sides thereof by upper and lower support dies and then simultaneously moving said upper and lower support dies downwardly to effect cold working of the tab progessively from an inner end toward the free end thereof to cause the tab to be deformed into a transverse downwardly-projecting position.

25. A process for forming a bed assembly for a vehicle, comprising the steps of:

providing a wide bed member defined of thin metal sheet and longitudinally elongated between front and rear free edges and having a plurality of parallel and sidewardly-spaced channel-like stiffening ribs roll-formed therein and extending longitudinally throughout the longitudinal length of the bed member so as to terminate at said front and rear edges;

deforming the channel-like stiffening ribs over a selected longitudinal distance adjacent one said edge to define a generally planar flange which extends substantially continuously along said one edge in transverse relation to the bed member;

engaging and downwardly deforming opposite longitudinally-extending co-planar side edge parts which are defined adjacent and define opposite longitudinally-extending side edges of said bed member to define downwardly cantilevered edge flanges which project generally transversely with respect to said bed member;

thereafter positioning said bed member in supportive engagement over a transverse cross support which is disposed adjacent and substantially under said one edge so that said planar flange overlies an exterior surface of said cross support, and thereafter fixedly securing said bed member to said cross support.

26. A process according to claim 25, including the steps of initially and substantially continuously roll-forming said channel-like stiffening ribs lengthwise in a wide and substantially continuous flat sheet, then transversely severing said sheet to define said bed member of predetermined longitudinal length, and thereafter deforming the channel-like stiffening ribs to define said planar flange.

* * * * *